US010713888B2

(12) United States Patent
Ruiz et al.

(10) Patent No.: US 10,713,888 B2
(45) Date of Patent: Jul. 14, 2020

(54) GAMING SYSTEM HAVING BOOT LOCKED VALIDATION OF PROGRAM INSTALLS, DATA INSTALLS AND PROGRAM LAUNCHES

(71) Applicant: AGS LLC, Las Vegas, NV (US)

(72) Inventors: James Andrew Ruiz, Lawrenceville, GA (US); Anil Kumar Narra, Alpharetta, GA (US); Jerish Augustine, Snellville, GA (US); Thomas Edward Moore, Marietta, GA (US)

(73) Assignee: AGS LLC, Las Vegas, NV (US)

( * ) Notice: Subject to any disclaimer, the term of this patent is extended or adjusted under 35 U.S.C. 154(b) by 145 days.

(21) Appl. No.: 15/909,698

(22) Filed: Mar. 1, 2018

(65) Prior Publication Data

US 2019/0272705 A1 Sep. 5, 2019

(51) Int. Cl.
*G07F 17/32* (2006.01)
*G06F 21/60* (2013.01)
(Continued)

(52) U.S. Cl.
CPC .......... *G07F 17/3241* (2013.01); *G06F 8/61* (2013.01); *G06F 21/602* (2013.01); *G06F 21/81* (2013.01);
(Continued)

(58) Field of Classification Search
CPC .......... G07F 17/3241; G07F 17/3209; G07F 17/3213; G07F 17/3225; G07F 17/3232;
(Continued)

(56) References Cited

U.S. PATENT DOCUMENTS 5,643,086 A * 7/1997 Alcorn ..................... G06F 21/00
463/29
5,700,195 A * 12/1997 Halic ....................... G07F 17/32
194/206

(Continued)

FOREIGN PATENT DOCUMENTS

WO 0251998 A2 2/2002
WO 2008108916 A1 9/2008

OTHER PUBLICATIONS

International Search Report and Written Opinion dated May 13, 2019 in International Patent Application No. PCT/US2019/019108.

(Continued)

*Primary Examiner* — David L Lewis
*Assistant Examiner* — Matthew D Hoel
(74) *Attorney, Agent, or Firm* — Vierra Magen Marcus LLP

(57) ABSTRACT

Security measures for an automated gaming system are disclosed. When pre-identified segments of code and/or data are installed into the gaming system, the installation is automatically carried out under control of scripts that cause a corresponding installer to automatically install the identified segments and at the same time automatically generate respective verification records for the installed segments and to automatically send to a secured database, the generated verification records and their respective segment identifications and to cause the database to automatically receive and encrypt the received verification records, to store the encrypted verification records in association with their respective segment identifications and to store in an essentially read-only portion of the database and in association with respective ones of the segment identifications, corresponding decryption keys and/or identifications of decryp- (Continued)

tion procedures that can be used to decrypt the encrypted verification records.

17 Claims, 10 Drawing Sheets

(51) Int. Cl.
*G06F 21/81* (2013.01)
*G06F 21/86* (2013.01)
*G06F 8/61* (2018.01)
*H04L 29/06* (2006.01)
*H04L 9/32* (2006.01)

(52) U.S. Cl.
CPC .......... *G06F 21/86* (2013.01); *G07F 17/3209* (2013.01); *G07F 17/3213* (2013.01); *G07F 17/3225* (2013.01); *H04L 9/3213* (2013.01); *H04L 9/3242* (2013.01); *H04L 9/3271* (2013.01); *H04L 63/0435* (2013.01); *H04L 63/0876* (2013.01); *G07F 17/3232* (2013.01)

(58) Field of Classification Search
CPC .......... G06F 8/61; G06F 21/602; G06F 21/81; G06F 21/86; H04L 9/3213; H04L 9/3242; H04L 9/3271; H04L 63/0435; H04L 63/0876
See application file for complete search history.

(56) References Cited

U.S. PATENT DOCUMENTS

| | | | | |
|---|---|---|---|---|
| 5,707,286 A * | 1/1998 | Carlson | ...................... | G06F 7/58 463/16 |
| 6,071,190 A * | 6/2000 | Weiss | ...................... | G07F 17/32 463/16 |
| 6,106,396 A * | 8/2000 | Alcorn | ...................... | G06F 21/00 463/29 |
| 6,149,522 A * | 11/2000 | Alcorn | ...................... | G06F 21/00 463/29 |
| 6,210,274 B1 * | 4/2001 | Carlson | ...................... | G06F 7/58 463/16 |
| 6,264,561 B1 * | 7/2001 | Saffari | ...................... | A63F 3/081 463/16 |
| 6,364,769 B1 * | 4/2002 | Weiss | ...................... | G07F 17/32 463/16 |
| 6,411,941 B1 | 6/2002 | Mullor et al. | | |
| 6,527,638 B1 * | 3/2003 | Walker | ...................... | G07F 17/32 463/25 |
| 6,620,047 B1 * | 9/2003 | Alcorn | ...................... | A63F 13/08 463/37 |
| 6,805,634 B1 * | 10/2004 | Wells | ...................... | A63F 13/12 463/42 |
| 6,986,055 B2 * | 1/2006 | Carlson | ...................... | G06F 7/58 463/22 |
| 7,043,641 B1 * | 5/2006 | Martinek | ............... | G06F 21/123 380/251 |
| RE39,368 E * | 10/2006 | Alcorn | ............................. | 463/29 |
| RE39,369 E * | 10/2006 | Alcorn | ...................... | G06F 21/00 463/29 |
| RE39,370 E * | 10/2006 | Alcorn | ............................. | 463/29 |
| RE39,400 E * | 11/2006 | Alcorn | ............................. | 463/25 |
| RE39,401 E * | 11/2006 | Alcorn | ............................. | 463/29 |
| 7,203,841 B2 * | 4/2007 | Jackson | .................. | G06F 21/64 380/251 |
| 8,784,195 B1 | 7/2014 | Crowder, Jr. | | |
| 8,900,054 B2 | 12/2014 | Patel | | |
| 8,939,834 B2 * | 1/2015 | Bond | ...................... | G06F 21/51 463/29 |
| 9,128,835 B2 | 9/2015 | Cadima et al. | | |
| 2003/0014639 A1 | 1/2003 | Jackson et al. | | |
| 2004/0259643 A1 | 12/2004 | Gentles | | |
| 2010/0062844 A1 | 3/2010 | Crowder, Jr. et al. | | |
| 2010/0248814 A1 | 9/2010 | Carson, Jr. et al. | | |

OTHER PUBLICATIONS

Gaming Laboratories International, LLC, Gaming Labs Certified, Standard Series, GLI-21: Client-Server Systems, Version 2.2, Sep. 6, 2011, 26 pages.

U.S. Appl. No. 15/787,649, filed Oct. 18, 2017, 39 pages.

* cited by examiner

GAMING SYSTEM HAVING BOOT LOCKED VALIDATION OF PROGRAM INSTALLS, DATA INSTALLS AND PROGRAM LAUNCHES

TECHNICAL FIELD

The present disclosure of invention relates to operations of a gaming machine within a gaming environment.

BACKGROUND

Slot-type electronic and/or mechanical gaming machines, often also referred as slot machines, are popular fixtures in casino or other gaming environments. Such slot machines are generally controlled by installed software programs. Aside from slot machines, various other kinds of gaming devices, including electronically-assisted gaming tables are also generally controlled by installed software programs. Participants in gaming environments may include one or more primary players who are directly using the slot or other software driven gaming apparatuses, one or more locally adjacent players who are directly using locally adjacent slot or other software driven gaming apparatuses, in-casino further players who are participating in an in-casino progressive jackpot pool, wide area players who are participating in a state sanctioned wide area progressive jackpot pool, adjacent bystanders (e.g., players' friends) who are standing nearby the primary players and nearby passers by who happen to be passing by in an area where they can view part of the gaming action(s) of one or more of the slot or other software driven gaming apparatuses including displays of the progressively growing local or other area jackpot pools and the occasional awarding of such jackpots.

Slot machines may use mechanical reels or wheels and/or video reels or wheels to present both action during development of a game outcome and a finalized outcome of a slot game to a corresponding one or more players. Typically, before each gaming action by the machine (e.g., spinning of the reels or wheels), the player is required to ante up by placing at least one wager on the outcome of the gaming action. In some games, a player can elect to have part of one of his/her wagers contributed to a progressive jackpot pool. Excitement grows as the size of the progressive jackpot pool reaches relatively large values. Chances for winning the progressive jackpot pool can come in various software mediated ways. For example, the player may select or define (or may have automatically pre-determined for the player) a line, pattern or other set of symbol spots that will operate as an actively-wagered upon pay line or pattern along which, game-generated randomly distributed symbols are evaluated to determine if a winning combination is present (e.g., a sequence defining combination such Jack, Queen, King, Ace, etc. cards, hereafter also J, Q, K, A). If the actively-wagered upon pay line or pattern provides a winning combination, the player is rewarded (e.g., monetarily and/or otherwise). Various outcome enhancing symbols such as wild symbols can appear on the reels or wheels of the game. Wild symbols typically serve as outcome enhancing substitutes for symbols needed to form a winning combination. In various prior art games, wild symbols: (1) can come into existence by other symbols individually morphing into wild symbols; (2) they can be individually copied from one reel or wheel to another; (3) they can be dropped from an animated character (e.g., cartoon) onto the reels or wheels to individually change existing symbols on a scatter distributed basis; and (4) they can populate a reel or wheel more frequently during so-called, free spins. On occasions, a player may be awarded with a wheel spin that gives the player a crack at the progressive jackpot pool. Due to such occasional sprinklings of a chance of winning the progressive jackpot pool, the primary players and adjacent other persons may experience various emotional responses and derive entertainment value from not only the unique ways in which various games are played and game outcomes are developed but also from the chance of winning the progressive jackpot pool.

Because sizes of progressive jackpot pools can be substantial, state and/or other government entities take interest in assuring that the progressive jackpot pools are run in fair and verifiable ways and pool awards are reported for taxation purposes. Casinos also take keen interest in assuring that the progressive jackpot pools are run in fair and verifiable way because the casinos can incur substantial losses if there is a compromise to the security and/or fairness aspects of the gaming actions carried out by their slot or other software driven gaming apparatuses.

One prior art method by way of which some jurisdictions assure fairness of operation of slot or other software driven gaming apparatuses is through GLI-21 (Gaming Laboratories International Client-Server Certification Standards) where a currently in force version of the certification process is Version 2.2 (released Sep. 6, 2011). Briefly according to the GLI-22 specification, a certain type of hash known as SHA-1 (Secure Hash Algorithm 1—specified by the US National Security Agency) is taken of various software code fragments as they are installed into respective servers that drive the slot or other software driven gaming apparatuses after the fairness of the software has been ascertained by a government approved testing institution. A GLI-certification letter is generated setting forth the hash results. Thereafter, a government agent may test any of the slot or other software driven gaming apparatuses for compliance with the GLI-certification letter (to verify that any sampled or all gaming action driving programs produced the same hash values at program launch time). Use of SHA-1 hashes for security purposes is also disclosed in Patel U.S. Pat. No. 8,900,054 (Dec. 2, 2014). Patel discloses that software packages added to a software library may be verified from package data using an MD5 or SHA-1 or some other verification tool. According to Patel '054 the verification string may be added to a package header and used to re-verify the package after it is downloaded to the EGM 213. All verification failures and related errors may be logged, and the log entry may contain the date and time, the ID of the person running the process at the time, and the specific type of error that occurred. According to Patel '054: A build package utility is used to generate download packages, and a package installed utility is supplied on the EGM to install downloaded packages. Both of these perform necessary compression and decompression as well as the data integrity checks of the contents of the package. The package builder utility calculates a SHA-1 hash value over the entire data contents of the package. This is then stored in the package header and is used by the package receiver and installed on the EGM to validate the contents of the package. The package will not be installed on the EGM unless it passes this SHA-1 validation.

While the GLI-22 process provides a relatively strong level of protection, it is possible to provide even stronger levels of protection against compromise of the software programs that control slot or other software driven gaming apparatuses.

In one embodiment, certain ports of a gaming machine system are automatically repeatedly monitored by one or more watchdogging mechanism to determine whether any suspicious activities (e.g., unexpected service requests and/or service requests made by unexpected requestors) are taking place there. More specifically, such port watchdogging is disclosed in U.S. Ser. No. 15/787,649 filed Oct. 18, 2017 by Jasonlee Hohman and entitled "Server Process Validation". It is possible to provide yet stronger levels of protection. It is to be understood that some concepts and ideas provided in this description of the Background may be novel rather than part of the prior art.

SUMMARY

Various embodiments in accordance with the present disclosure of invention generally relate to improved security measures for programming and operating a gaming machine system. When pre-identified segments of code and/or data are to-be-installed into the gaming machine system, the installation is automatically carried out under control of production-house generated scripts that cause a corresponding automated installer to automatically install the identified segments and at the same time automatically generate respective verification records for the installed segments and to automatically send to a secured database, the generated verification records and their respective segment identifications and to cause the database to automatically receive and encrypt the received verification records, to store the encrypted verification records in association with their respective segment identifications and to store in an essentially read-only portion of the database and in association with respective ones of the segment identifications, corresponding decryption keys and/or identifications of decryption procedures that can be used to decrypt the encrypted verification records. In one embodiment, one or more of the identified decryption procedures are also stored in the essentially read-only portion of the database.

When verification occurs for the code and/or data installed under the script-driven control, a counterpart and automated verifier accesses an identified segment of code and/or data that had been installed into the gaming machine system; the verifier generates a verifier-produced verification record (e.g., a verifier-produced hash) for the accessed segment; the verifier submits an identification of the to-be-validated segment to the database with a request for the database to return a counterpart challenge verification record by decrypting an encrypted counterpart verification record stored in the essentially read-only portion of the database. The verifier then compares the returned counterpart challenge verification record with the verifier-produced one and responsive to the comparing indicating a match, outputs a validation signal.

The disclosed security measures provide improved security in that the installation is script driven and automated. In one embodiment, installation time is measured to assure that it completes within a prespecified time allotment. This helps to assure that a potential hacker has not paused the automated installation process and somehow compromised it. Also, because the database stores the corresponding decryption keys and/or identifications of the decryption procedures that are to be used to decrypt the encrypted verification records in an essentially read-only portion of the database (also referred to herein as an "eROM", and in one embodiment, also stores one or more of the decryption procedures the eROM), potential hackers are blocked from easily substituting in alternate encrypted verification records with corresponding decryption keys and/or identifications of the decryption procedures. Other aspects of the present disclosure will become apparent from the below detailed description.

More specifically, in accordance with one aspect of the present disclosure, a machine-assisted method of installing at least one of code (e.g., executable code) and data (e.g., control data) into a gaming machine system is provided comprising the steps of: (a) first supplying identified segments of at least one of the code and the data to a pre-installation build assembler; (b) second supplying installer-executable and corresponding scripts to the build assembler, the supplied scripts including instructions for automatically causing a prespecified secured database to receive from a prespecified installer respective verification records (e.g., hashes) for respectively identified ones of the first supplied segments, to encrypt the received verification records, to store the encrypted verification records in association with their respective segment identifications and to store in an essentially read-only portion of the database and in association with respective ones of the segment identifications, corresponding decryption keys and/or identifications of decryption procedures that can be used to decrypt the encrypted verification records; (c) third supplying to the prespecified installer a build generated by the build assembler, the supplied build including the corresponding scripts and the respectively identified segments of at least one of the code and the data; and (d) actuating the prespecified installer to automatically install into the gaming machine system the supplied and respectively identified segments of at least one of the code and the data, to automatically generate the respective verification records (e.g., hashes) for the installed segments and to automatically execute the scripts supplied by said third supplying so as to thereby cause the installer to send to the database, the generated verification records and their respective segment identifications and to cause the database to automatically receive and encrypt the received verification records, to store the encrypted verification records in association with their respective segment identifications and to store in the essentially read-only portion of the database and in association with respective ones of the segment identifications, the corresponding decryption keys and/or identifications of decryption procedures that can be used to decrypt the encrypted verification records.

More specifically, in accordance with another aspect of the present disclosure, a machine-assisted method of validating at least one of code (e.g., executable code) and data (e.g., control data) that had been installed into a gaming machine system is provided comprising the steps of: (a) using a prespecified verifier to access an identified segment of code and/or data that had been installed into the gaming machine system; (b) causing the prespecified verifier to generate a verifier-produced hash of the accessed segment; (c) causing the prespecified verifier to submit an identification of the identified segment to an encrypted SQL database server with a request for the encrypted SQL database server to return a counterpart challenge hash by decrypting an encrypted counterpart hash stored in an essentially read-only portion of the encrypted SQL database server; and (d) causing the prespecified verifier to compare the returned counterpart challenge hash with the verifier-produced hash and responsive to the comparing indicating a match, to output a validation signal.

BRIEF DESCRIPTION OF DRAWINGS

The present disclosure may be better understood by reference to the following detailed description taken in conjunction with the accompanying drawings, which illustrate particular embodiments in accordance with the present disclosure of invention.

DETAILED DESCRIPTION

Reference will now be made in detail to some specific embodiments in accordance with the present disclosure of invention. While the present disclosure is described in conjunction with these specific embodiments, it will be understood that it is not intended to limit the teachings of the present disclosure to the described embodiments. On the contrary, it is intended to cover alternatives, modifications, and equivalents as may be included within the spirit and scope of the teachings of the present disclosure.

In the following description, numerous specific details are set forth in order to provide a thorough understanding of the present disclosure. Particular embodiments may be implemented without some or all of these specific details. In other instances, well known process operations have not been described in detail in order not to unnecessarily obscure the present disclosure of invention. Although not explicitly shown in many of the diagrams, it is to be understood that the various automated mechanisms discussed herein typically include at least one data processing unit such as a central processing unit (CPU) where multicore and other parallel processing architectures may additionally or alternatively be used. It is to be further understood that the various automated mechanisms typically include or are operatively coupled to different kinds of non-transient storage mechanisms including high speed caches (which could be on-chip, package secured caches), high speed DRAM and/or SRAM, nonvolatile Flash or other such nonvolatile random access and/or sequential access storage devices, magnetic, optical and/or magneto-optical storage devices and so on. The various data processing mechanisms and data storage mechanisms may be operatively intercoupled by way of local buses and/or other communication fabrics where the latter may include wireless as well as wired communication fabrics.

In general, gaming systems which provide wager-based games are described. In particular, with respect to FIGS. 1 and 2A, a gaming machine system including a plurality of automated wager-based gaming machines in communication with network devices is described. The gaming machine system can support wager-based games where a progressively growing prize or award is made possible and/or where the unleashing of a whole series of bonuses or other awards is made possible.

Figure 1:
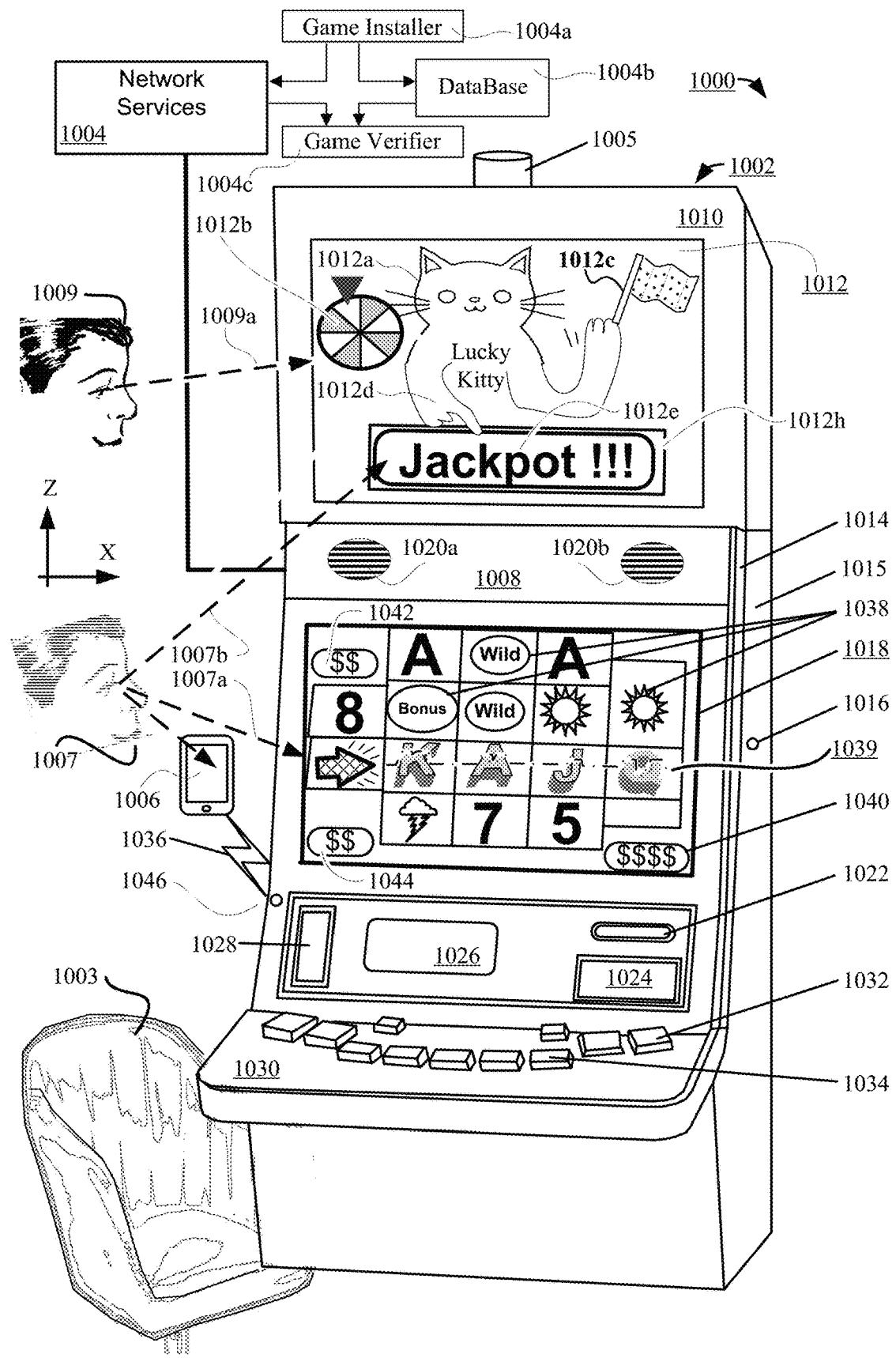
FIG. 1 illustrates a gaming system and environment including a wager-based gaming machine in accordance with the present disclosure.

FIG. 1 illustrates part of an automated gaming system 1000 in accordance with the disclosure that includes a wager-based gaming machine 1002 (e.g., a slot machine). The wager-based gaming machine 1002 can include wireless or wired communication interfaces which allow communications with remote servers and/or other devices including a remote services providing network 1004 (e.g., having service providing servers and/or other data storing, communicating and data processing units—not explicitly shown). The services providing network 1004 can provide privacy/integrity-secured services such as but not limited to player tracking and progressive gaming. (Some specific network services are described in more detail in conjunction with FIG. 2A). The player tracking service can be part of a slot accounting system that for example keeps track of each player's winnings and expenditures (including, in some embodiments, player contributions to one or more progressive jackpot pools). In addition, the gaming machine 1002 can include wireless communication interfaces, such as a wireless interface 1046 (internal, not specifically shown) which allow communication with one or more mobile devices, such as a mobile phone 1006 (only one shown), a tablet computer, a laptop computer and so on via respective wireless connections such as 1036. The wireless interface 1046 can employ various electronic, optical or other electromagnetic wireless and secured or non-secured communication protocols, including for example TCP/IP, UDP/IP, Bluetooth™ or Wi-Fi.

The respective mobile phones (e.g., 1006) and/or tablet computers and/or other mobile devices can be owned and/or utilized by various players, potential customers, authorized casino operators or authorized gaming inspectors. A mobile device carried by a primary player (e.g., 1007) can be configured to perform gaming related functions, such as functions associated with transferring funds to or from the specific gaming machine 1002 and the primary player's account(s) or functions related to player tracking. A mobile device carried by a casino operator can be configured to perform operator related functions, such as performing hand pays, responding to tilt conditions or collecting metering related information. A mobile device carried by an authorized gaming inspector can be configured to perform inspection related functions, such as actuating software verification procedures.

Use of mobile devices is not limited to secured transactions. In one embodiment, mobile devices may be used for social networking. For example, a primary player 1007 may authorize his/her mobile device (e.g., 1006) to automatically interact with a currently used gaming machine 1002 for the purpose of automatically posting to a user-chosen social network various announcements such as, but not limited to, that the primary player 1007 has been having fun playing the Lucky Kitty game (a fictitious name for purposes herein) for X hours at the given gaming establishment or that the Lucky Kitty game has just awarded the primary player 1007 a symbols upgrade that now gives that player an opportunity to spin for a jackpot and/or other awards. The primary player 1007 may alternatively or additionally authorize his/her mobile device (e.g., 1006) to automatically announce (wirelessly) to a selected group of friends or associates that player 1007 has just been awarded an opportunity to spin for a jackpot and/or other awards and inviting them to stop by and watch the fun (e.g., as nearby other person 1009 is doing over the shoulder of the primary player 1007, where the latter in one embodiment, is seated in chair 1003 situated in front of gaming machine 1002.)

According to the same or an alternate embodiment, the primary player 1007 may use his/her mobile device (e.g., 1006) to temporarily reserve the particular gaming machine 1002 for a predetermined amount of time (e.g., no more than say 10 to 30 minutes) so that the primary player may temporarily step away to attend to various needs. While the primary player 1007 is temporarily away, the gaming machine 1002 may display a reservation notice saying for example, "This machine is reserved for the next MM minutes by a winning player who was recently awarded a lucky opportunity to spin for a jackpot and/or other awards. Stand by and watch for more such lucky opportunities!" (where here MM is a progressively decreasing time counter). The reservation notice may be prominently posted on an upper display 1012 of the gaming machine 1002 as shall next be described.

The gaming machine 1002 can include a base cabinet 1008 and an upper or top box 1010 fixedly mounted above the cabinet. The top box 1010 includes an upper display 1012. The upper display 1012 can be used to display video content, such as game art associated with the game being currently played on the gaming machine 1002. For example, the game art can include one or more animated wheels or reels (or other chance/opportunity indicating mechanisms) and/or one or more animated creatures (e.g., the flag waving Lucky Kitty illustrated at 1012*a*). The animated wheels or reels (e.g., virtual wheel 1012*b*) can be configured to spin and to stop to reveal an occasional opportunity to spin for a jackpot and/or other awards and/or the awarding of a grand prize such as a progressive jackpot 1012*e*. In one embodiment, the predetermined stoppage position or area or awarding of a substantially large prize (e.g., jackpot 1012*e*) may be pointed to by an animated finger 1012*d* of the Lucky Kitty character 1012*a* (or other appropriate animated figure). In one embodiment, a free other hand of the character may wave or otherwise gesture to attract attention to the current selection of an upcoming opportunity to spin for a jackpot and/or other awards and/or the actual awarding of a grand prize such as a progressive jackpot 1012*e*. The Lucky Kitty character 1012*a* (or other appropriate animated figure) may wave an attention getting flag 1012*c*, or a virtual fireworks sparkler, etc. at the appropriate times. At other times and/or in other examples, the video content of the upper display 1012 can include advertisements and promotions, such as for example, "A jackpot amount of more than $100,000 was awarded on this machine two weeks ago. Is this a lucky machine for you too?" In accordance with an aspect of the present disclosure, security measures are automatically and repeatedly taken to assure that only approved software programs are installed and run on or for the slot or other software driven gaming apparatuses. More details are provided below in conjunction with FIG. 2B. Briefly and for sake of introduction, a gaming control program (e.g., one composed of executable code and control data) may be installed into the network services block 1004 by a software driven installer 1004*a*. At the time of installation, the installer 1004*a* also stores software verification data into database 1004*b*. Later when the installed gaming control program is called on, but before it execution proceeds, a software driven verifier 1004*c* automatically accesses the stored verification data in the database 1004*b* and uses it to verify that the called upon program is the same as the originally installed program. This should prevent software hackers from maliciously introducing unapproved gaming control code into the network services block 1004 with the aim for example, of causing a jackpot to be awarded to them themselves or to their associates.

Returning first to a further description of FIG. 1, in alternate embodiments, the top box 1010 can include one or more mechanical and/or electronic devices in addition to the upper video display 1012. For example, mechanical devices, such as one or more mechanical wheels can be mounted to or within the top box 1010. The mechanical wheel(s) can include markings that indicate various bonus award situations and/or situations where large jackpots might be won. The wheel(s) can be spun and stopped at particular stopping points to reveal a bonus award situation or a multi-symbol transformation situation (e.g., awarding multiple wild cards, where the latter can increase the chance for winning a jackpot 1012*e*). In yet other embodiments, the top box 1010 can include a plurality of upper displays that provide similar functions. With respect to chance providing mechanisms as described herein, it is to be understood that such can include not only mechanical chance providing mechanisms (e.g., mechanical spinning wheel with relatively unpredictable stop position), but also electronically based chance providing mechanisms that can be implemented in the form of digital and/or analog electronic circuits. Such circuits may rely on flip-flops or registers designed with intentional meta-stability and/or on noise intolerant switching circuits that are intentionally exposed to random noise (e.g., thermal noise) so as to provide relatively random and unpredictable outcomes. In one embodiment, one of the tasks of a described code/data verifier is to verify that utilized software and control data use pre-approved hardware, firmware and/or software for properly providing random chances of respective predetermined probabilities at winning and or getting a chance to spin for respective prizes including for a progressive jackpot pool.

It will be appreciated by those familiar with gaming environments that participants in various gaming environments (also briefly see FIG. 2A) include respective primary players like 1007 who are directly using their respective slot machines (e.g., 1002) and are each typically seated on a chair (e.g., 1003) disposed in front of the gaming machine so as to thereby position that primary player's eyes substantially level with a central vertical position (along the vertical Z axis) with a primary game outcome display area 1018 of the gaming machine 1002 thus allowing for a comfortable gaze angle indicated by viewing vector 1007*a*. The primary game outcome display area 1018 typically being positioned vertically below and slightly spaced apart from the upper video display area 1012. The vertical elevation of the upper video display area 1012 is chosen so as to be easily viewed by adjacent player(s) who is/are directly using adjacent slot machines (for example at an eye incline angle shown as viewing vector 1007*b*) and also to be easily viewed by adjacent bystanders 1009 (e.g., a player's friends) who are standing nearby the primary player or nearby one of the adjacent players or are nearby passers by who happen to be passing by in an area where they can view part of the gaming action(s) of one or more of the slot machines; and in particular the actions displayed by the upper video display 1012 at a comfortable viewing vector 1009a. Due to real or simulated movements of the mechanical reels and/or video reels in the primary game outcome display area 1018 and in the upper video display area 1012, the primary players and the adjacent other persons may experience various emotional responses and derive entertainment value and expectations for further excitement from the unique ways in which the slot game (e.g., the Lucky Kitty game illustrated as an example in areas 1012 and 1018 or other such software driven gaming actions) are progressing. For example, when a low frequency winning hand appears on a wagered-for pay line such as 1039, attention grabbing other symbols (e.g., flashing arrow noted by gaze line 1007a) may be automatically presented on the gaming machine. In accordance with one aspect of the present disclosure, before the primary player 1007 spins for the jackpot (e.g., using virtual wheel 1012b), attention grabbing further and larger displays appear on the upper video display 1012 (e.g., "Big Win Possible Here!"—not shown) so they are in the line of sight 1009a of bystanders or other primary players. This can increase emotional levels of all involved and heightened enjoyment of the gaming actions. In other words, a mixture of emotions may be created of both heightened expectations and foreboding that all the expected rewards may or may not be realized. If the primary player 1007 continues to win low frequency winning hands such as the King, Ace, Jack, Queen poker hand (K, A, J, Q) shown on line 1039, the expectations for jackpot or like big payouts can increase, thus providing increased entertainment and excitement to those nearby the gaming machine 1002 (and optionally to those on social media who are following the primary player's progress).

In terms of yet further details for one embodiment, the base cabinet 1008 includes an internal access entry mechanism instantiated for example as door 1014. The door 1014 swings outward and is coupled to a back portion 1015. The door 1014 includes a locking mechanism 1016. During normal operation, the door 1014 is locked. Typically, unlocking the door 1016 causes the gaming machine 1002 to enter a tilt mode where gaming functions, such as the play of a wager-based game, are not available. This tilt mode can be referred to as a hard tilt.

The cabinet 1008 can include a number of apertures that allow access to portions of a number of devices which are mounted within the cabinet. These gaming devices can include, but are not limited to displays such as 1018 and 1026, speakers such as 1020a and 1020b, a printer 1022, a bill acceptor 1024, a magnetic and/or chipped card reader 1028 and a resting shelf and/or button panel 1030 including buttons 1032 and 1034. As described in more detail below, these gaming devices can be used to generate wager-based game play on the gaming machine 1002.

In particular embodiments, the bill acceptor 1024 can be used to accept currency or a printed ticket which can be used to deposit credits into an account maintained for the primary player 1007 and/or the gaming machine 1002. The credits can be used for wagers. The printer 1022 can be used to print tickets to transfer credits from one gaming machine (e.g., 1002) to another or to monetize accumulated credits. Typically, the tickets can be redeemed for cash or additional game play, such as game play on another gaming machine or at a gaming table.

Figure 2A:
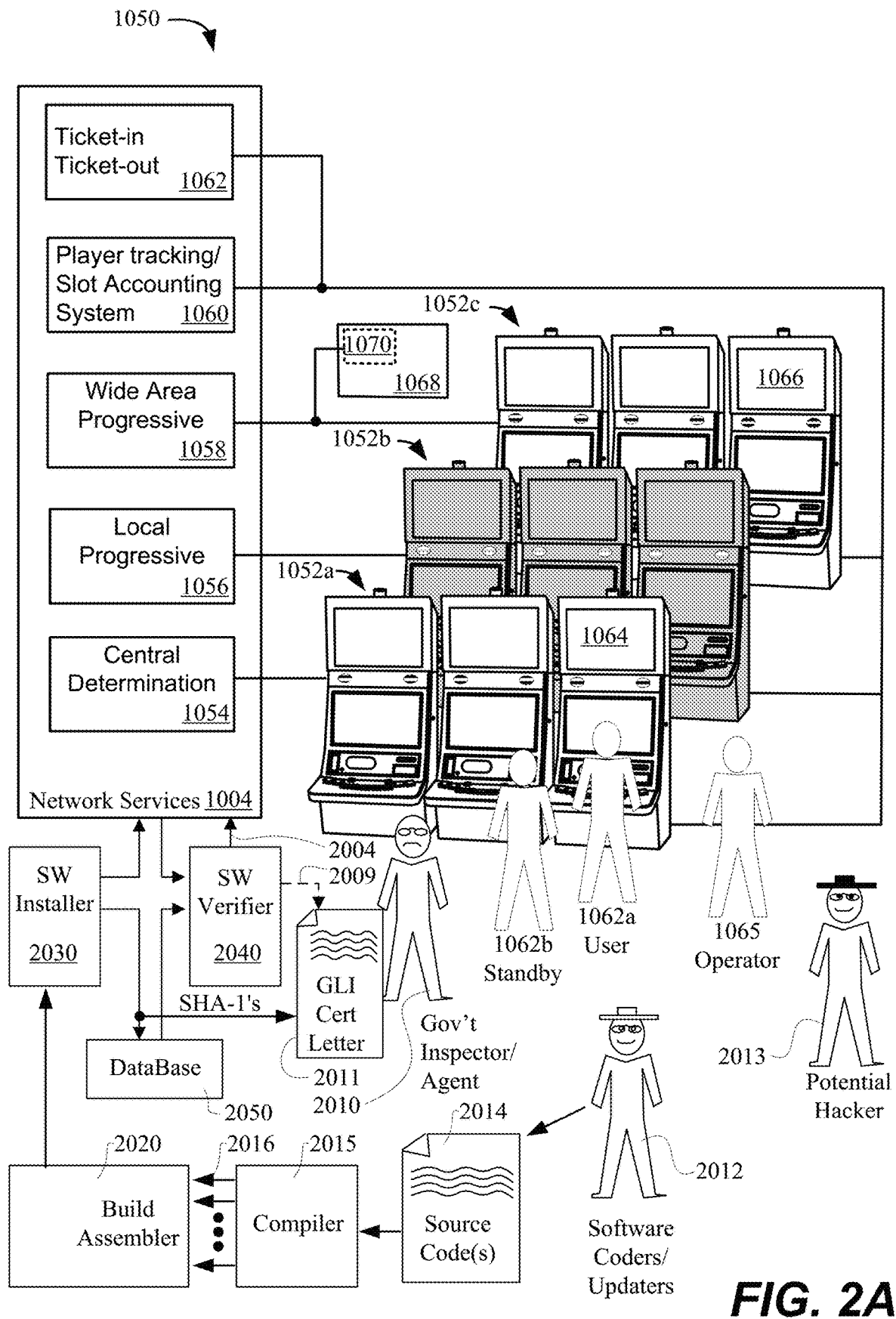
FIG. 2A illustrates a gaming system including three banks of gaming machines that may participate in a progressive jackpot pool.

The bill acceptor 1024 and printer 1022 printer can be part of ticket-in/ticket-out (TITO) system 1062 illustrated in FIG. 2. The TITO system 1062 can be included as one of the secured services provided by the services network 1004. The TITO system allows a ticket printed at a first gaming machine with a credit amount to be inserted into a bill acceptor at a second gaming machine and validated for game play. After validation, the credit amount associated with the ticket can be made available for game play on the second gaming machine. Additional details of the TITO system 1062 are described below in conjunction with FIG. 2A.

The bill acceptor 1024 can include a slot surrounded by a bezel which allows banknotes of various denominations or printed tickets to be inserted into the bill acceptor. The bill acceptor 1024 can include sensors for reading information from the banknotes and determining whether the banknotes inserted through the slot are valid. Banknotes determined to be invalid, such as damaged or counterfeit notes, can be automatically ejected from the bill acceptor 1024. In some instances, the bill acceptor 1024 can include upgradeable firmware and a connection to additional network services. Via the network connection, new firmware, such as new counterfeit detection algorithms can be downloaded for installation into the bill acceptor 1024.

The bill acceptor 1024 includes mechanisms for guiding the banknotes or printed tickets past the internal sensors. Banknotes or printed tickets which are accepted can be guided to a bill stacker (not shown) located within the cabinet 1008 of the gaming machine 1002. The bill stacker can hold a maximum number of bank notes or printed tickets, such as up to two thousand.

The gaming machine 1002 can include a sensor for detecting a fill level of the bill stacker. When the bill stacker is full or close to being full, the gaming machine 1002 can be placed in a tilt mode. Next, the cabinet door 1014 can be opened by authorized casino personnel and the full bill stacker can be replaced with an empty one. Then, the door 1014 can be closed and the gaming machine 1002 can be restored to a normal operational mode in which it is available for game play.

One function of the printer 1022 is to print "cash out" tickets. In a "cash out," credits available on the gaming machine can be transferred to an instrument, such as a printed and/or magnetically encoded ticket, or wirelessly transferred by way of a secure link to an appropriate account (e.g., the primary player's account) for later access. Typically, a "cash out" can be initiated in response to pressing one of the physical buttons, such as 1032 or 1034, or touch screen button output on a display, such as primary display 1018 or a secondary display such as the one 1026 illustrated to be smaller than and disposed below the primary game outcome display 1018.

In one embodiment, the printer 1022 can be a thermal printer. The printer can be loaded with a stack of tickets, such as a stack with two hundred, three hundred or four hundred tickets. Mechanisms in the printer can grab tickets from the ticket stack and transport the tickets past the print heads for printing. The ticket stack can be located in an interior of the gaming machine cabinet 1008.

The printer 1022 can include sensors for detecting paper jams and a status of the ticket stack. When a paper jam or low ticket stack is detected, the gaming machine 1002 can enter a tilt mode where game play is suspended. In one embodiment, a tower light 1005 disposed above the upper box 1010 can light to indicate the tilt status of the gaming machine 1002. After the tilt condition is cleared, such as by clearing the paper jam or replenishing the ticket stack, the gaming machine 1002 can enter a normal operational mode where game play is again available.

Figure 4:
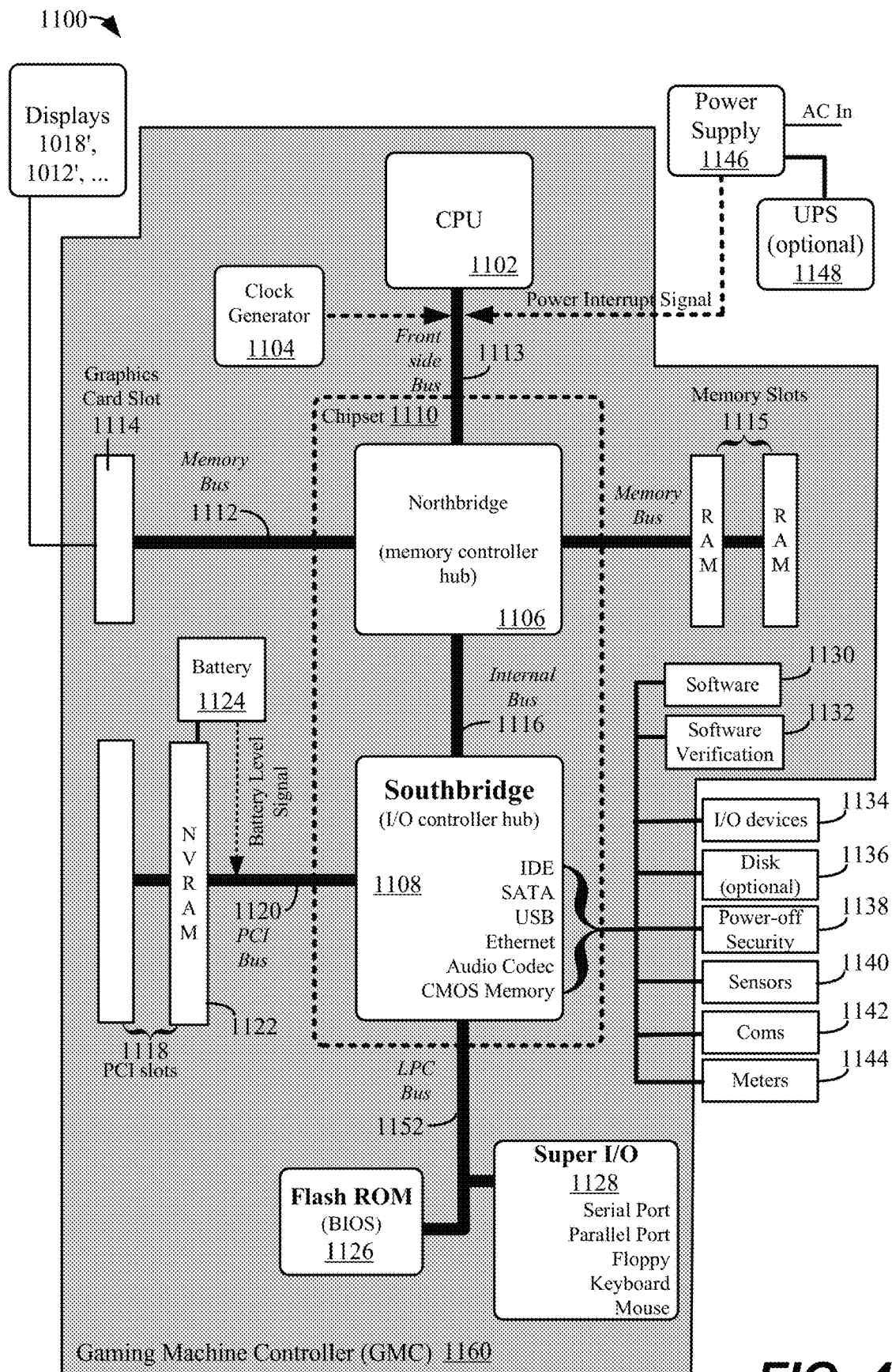
FIG. 4 illustrates a block diagram of gaming machine components including a gaming machine controller in accordance with the present disclosure.

In particular embodiments, the printer 1022 can be coupled to a gaming machine controller (see 1160 in FIG. 4). The gaming machine controller 1160 can be configured to send commands to the printer which cause a "cash out,"

ticket to be generated. In addition, the printer 1022 can be coupled to other systems, such as a player tracking system (e.g., 1060 in FIG. 2A). When coupled to the player tracking system, commands can be sent to the printer 1022 to output printed tickets redeemable for comps (comps refer to complimentary awards, such as but not limited to free credits, a free drink, a free meal or a free room) or printed coupons redeemable for discounts on goods and services.

As mentioned, in some embodiments, one or more wireless interfaces 1046 can be provided to operate as secured and/or unsecured wireless communication connections 1036. The wireless connections can be established for example between the gaming machine 1002 and one or more mobile devices, such as smart phone 1006. The wireless connection 1036 can be used to provide functions, such as but not limited to player tracking services, casino services (e.g., ordering drinks) and enhanced gaming features (e.g., displaying game play information on the mobile device). The wireless interface can be provided as a stand-alone unit or can be integrated into one of the devices, such as the bill/ticket acceptor 1022 and the card reader 1028. In addition, the bill/ticket acceptor 1022 and the card reader 1028 can each have separate wireless interfaces for interacting with the mobile device. In one embodiment, these wireless interfaces can be used with a wireless payment system, such as Apple Pay™ or Google Pay™. The wireless payment system can be used to transfer funds to the gaming machine that can be used for wager-based game play.

The door 1014 can allow secured entry access an interior of the cabinet 1008. Via this access, devices mounted within the cabinet, such as displays 1018, 1026; speakers 1020a, 1020b; bill/ticket acceptor 1022 or printer 1024 can be serviced and maintained. For example, a receptor configured to receive currency and tickets, coupled to the bill acceptor, can be emptied. The receptor is often referred to as a bill stacker. In another example, blank tickets can be added to the printer 1022 or paper jams can be cleared from the printer. When door 1014 is opened, the gaming machine can enter a hard tilt state where game play is disabled. Although not explicitly shown, the audiovisual input/output mechanisms of the gaming machine 1002 need not be limited to the illustrated displays 1018, 1026; speakers 1020a, 1020b and buttons 1032, 1034. Additional audiovisual input/output mechanisms may come in the form of touch-sensitive screens, haptic input/output devices such as vibrators, subwoofers, microphones for picking up verbal requests or audible indications of excitement by the primary player or adjacent other persons and so on. In one embodiment, the chair 1003 may be instrumented so as to detect not only when the primary player 1007 is seated on it, but also when that player is jumping up and down or otherwise moving in the chair due to heightened emotions. This detected movement can be fedback to the services providing network 1004 for adaptively learning what gaming combinations tend to provide more excitement and/or entertainment. With authorization by the primary player 1007, a microphone and/or motion detector on his/her mobile device 1006 may be activated to provide similar automated feedback.

In addition, a number of further devices (not shown) can be provided within the interior of the cabinet 1008. A portion of these devices is not visible through an aperture in the gaming machine cabinet 1008. For example, a gaming machine controller (GMC) which controls play of a wager-based game on the gaming machine can be found within the cabinet 1008. Typically, the gaming machine controller is secured within a separate lockable enclosure. Details of the gaming machine controller are described below with respect to element 1160 in FIG. 4.

As another example, a number of security sensors can be placed within the interior of the cabinet 1008. The security sensors (e.g., see 1140 in FIG. 4) can be configured to detect access to the interior of the gaming machine 1002. For example, the sensors can be configured to detect when the locking mechanism 1016 is actuated, the door 1016 is opened or a locking mechanism associated with the gaming machine controller enclosure is actuated. A power source, separate from an external power supply, such as a battery can be provided which allows the security sensors to operate and be monitored when the external power supply is not connected or stops functioning for other reasons.

In particular embodiments, the cabinet 1008 can have a sheet metal exterior designed to provide the rigidity needed to support top boxes, such as 1010 and light kits as well as to provide a serious deterrent to forced entry. For example, the sheet metal can be sixteen gauge steel sheet. Additionally, the door, such as 1014, can be backed with sheet steel in the areas around the displays. Other materials, such as wood, wood composites, can be incorporated into the cabinet and the example of sheet metal is provided for the purposes of illustration only.

Speakers, such as 1020a and 1020b (only two shown, but there can be more elsewhere disposed), can be protected by a metal screen. In one embodiment, a speaker, such as 1020a or 1020b, can include a subwoofer speaker portion. In general, a sound system associated with the gaming machine 1002 can include an audio amplifier and one or more speakers of various types, such as subwoofers, midrange speakers, tweeters and two-way speakers that also accept voice input.

If the main cabinet 1008 is entered, a "DOOR OPEN TILT" can be displayed halting game play and causing a "DOOR OPEN" event to be sent to the slot accounting system in 1004. In one embodiment, this message can be displayed on the main display 1018. These events can also be stored to the power hit tolerant memory. Upon door closure, the "DOOR OPEN TILT" will be replaced with a "DOOR CLOSED TILT" that can clear after the completion of the next game cycle. Additionally, a logic "DOOR OPEN TILT" can occur if the logic door is opened. The logic door is configured to be lockable independent of how the switch wiring is installed. The gaming machine 1002 can be configured to initiate the logic DOOR "OPEN TILT" regardless of whether or not a lock is installed on the logic door.

The displays such as 1018, 1012 and 1026, the speakers 1020, the printer 1022, the bill acceptor 1024, the card reader 1028 and the button panel 1030 can be used to generate a play of a wager-based game on the gaming machine 1008. Further, the primary display 1018 can include a touchscreen function. The touchscreen function can be used to provide inputs used to play the wager-based game. Some examples of wager-based games that can be played include but are not limited to slot games, card games, bingo games and lottery games. The wager-based games are typically games of chance and utilize a random number generator to determine an outcome to the game.

In general, the wager-based games can be classified as Class II and Class III games. Class II games can include bingo, pull tabs, lottery, punch board, tip jars, instant bingo and other bingo like games. Class III games can include but are not limited to slot games, black jack, craps, poker and roulette.

As described above, the wager-based game can be a slot game. The play of the slot game can involve receiving a wager amount and initiating a start of the wager-based game. A selection of a wager amount and a start of the wager-based game can be performed using buttons, such as 1032 and 1034, on button panel 1030. In addition, the button panel can be used to perform gaming functions, such as selecting a number of lines to play in a slot game, selecting the amount to wager per line, initiating a cash-out and calling an attendant. These functions will vary for different types of games.

In some embodiments, a touch screen function can be provided in or adjacent to (e.g., over) one or more of the displays, such as 1012, 1018 and/or 1026. The combination of the display and touch screen can be used to perform gaming functions that performed using the button panel 1030. Also, display and touch screen can be used to perform operator features, such as providing a game playback or a hand pay.

The play of wager-based game, such as a slot game, can involve making a wager and then generating and outputting a game presentation. The bet amount can be indicated in display area 1042. The game presentation can include a number of game features that vary from game to game. The game features provide variety in how the outcome to the wager-based is presented. For example, an award to the outcome of the game can be presented in a series of steps that vary from game to game. In some instances, a portion of the total award for a game can be awarded in each step. The steps and their graphical presentation can be referred to as game features. In various embodiments, information associated with one or more of the steps can be stored to a power hit tolerant memory. The power hit tolerant memory is discussed in more detail with respect to FIG. 6.

As an example, a portion of a slot game outcome presentation is shown on display 1018. The slot game outcome presentation can include displaying a plurality of normal reel symbols, such as pointed to by reference 1038 (e.g., blazing sun symbol, wild card symbol, bonus symbol etc.). During the game outcome presentation, the symbols can appear to move on the display 1018 (e.g., vertically to simulate a rotating reel). In addition, symbols can be made to appear to move off the display 1018 and new symbols can be made to newly appear onto the display 1018.

Different combinations of symbols can appear on the primary display 1018 for some period of time, which varies for each instance of the wager-based game that is played. At the end of an action-filled presentation, the symbols can be made to appear to settle and reach a final position or spin outcome. Then an award associated with the game outcome is presented on the display. The total award for the game can be indicated in display area 1044 for example and the total credits available on the gaming machine after the award can be indicated in display area 1040.

In particular embodiments, a portion of the award to the outcome of a game or spin can be presented as a bonus game or a bonus spin (e.g., a free spin). The portion of the award can be referred to a bonus award. The presentation of the bonus award can also be presented in steps where a portion of the bonus award is awarded in each step. These steps can be referred to as bonus game features. In some embodiments, information associated with the steps in the bonus game can be stored to the power hit tolerant memory. In various embodiments, components of the bonus game presentation can be presented on one or more of display 1018, 1012 and 1026.

More specifically in one embodiment, when a given spin takes place (e.g., indicated as such in one of display areas 1018, 1012 and 1026), a by-chance bonus awarding wheel 1012b is presented for actuation by the primary player 1007 (or by a casino dealer in case of a table game) and when actuated, it starts spinning. As the symbols of the spinning wheel 1012b in the primary display area 1018 start settling into a near-final outcome state, a relatively large horizontal announcement area 1012h may first indicate how close to a jackpot win is the state of the spinning wheel 1012b, and then when the wheel 1012b finally settles into its final outcome state, announcement area 1012h may indicate the win as shown at 1012e (e.g., "Jackpot!!!") or how close the spin came (e.g., "Missed by one rung!"—not shown). Announcement area 1012h may also be used to indicate the winning of low frequency hands (e.g., "Royal Flush Here!!"—not shown).

Next, referring to FIG. 2A, further details of one embodiment of the network services providing portion 1004 and of gaming machine operations, including securitization features and possible points of weakness are described. In FIG. 2A, gaming system 1050 includes three banks of gaming machines, 1052a, 1052b and 1052c. For purposes of illustration, three side-by-side gaming machines are shown in each bank although a different number could be used (e.g., 4, 5, 6 etc.).

The network services providing portion 1004 includes a central determination server 1054, a local progressive server 1056, a wide area progressive server 1058, a player tracking/slot accounting system server 1060 and ticket-in/ticket-out (TITO) server 1062. In gaming system 1050, all of the gaming machines in each bank, 1052a, 1052b and 1052c, are operatively coupled to the slot accounting system server 1060 and the TITO server 1062. However, only the gaming machines in bank 1052a are coupled to the central determination server 1054. Further, only gaming machines in bank 1052b and display 1068 are coupled to the local progressive server 1056. Finally, only the gaming machines in bank 1052c are coupled to the wide area progressive server 1058. The communication couplings between the gaming machines in each bank and the servers 1054, 1056, 1058, 1060 and 1062 can be wired connections, wireless connections or various combinations/permutations thereof.

In various embodiments, the central determination server 1054 can be used to generate a controlling portion of the game played on the gaming machines in bank 1052a. For example, the central determination server 1054 can be used to generate random numbers used to determine outcomes to the games played in bank 1052a. In another example, the central determination server 1054 can be used to generate all or a portion of the graphics used during play of the games on the gaming machines in bank 1052a. For instance, the central determination server 1054 can be configured to stream a graphical presentation of a game to a gaming machine, such as that of upper display graphics 1064 and/or of the gaming machine's lower displays. (Lower displays not numbered here because primary player 1062a is illustrated obstructing those further displays.) The streamed upper display graphics 1064 may include that which on occasion (e.g., randomly or pseudo-randomly) reveals an active special bonus situation (e.g., Possible Jackpot win Here), reveals the awarding of a substantial prize (e.g., Jackpot !!! 1012e). The streamed graphical presentations can be output to respective displays on respective ones of the gaming machines and also to additional larger displays mounted on walls or other fixtures near the respective bank of machines.)

In one embodiment, the central determination server 1054 can be used to generate numbers used in a bingo type games played on the gaming machine in bank 1052*a*. These bingo type games are often referred to as class II games whereas traditional slot machines are referred to as class III games. In class II games, a draw of numbers is made. The numbers can be mapped to a bingo card, which the player purchases to play the bingo game. The draw of numbers can result in at least one winning game combination on the bingo cards participating in the current bingo game.

The central determination server 1054 can be configured to repeat the number draws for the bingo games at regular intervals. For example, number draws can be repeated every 20 milliseconds. Players at the various gaming machines coupled to the central determination server 1054, such as the players at the gaming machine in bank 1052*a*, can initiate bingo games which utilize the bingo numbers from a particular bingo number draw. The bingo numbers in the number draw can be mapped to a bingo card displayed on the screen of the gaming machine, such as 1064.

Wins can be indicated by a winning pattern on the bingo card, such as four in a row or four corners. In response to a winning pattern on a bingo card on a particular gaming machine, the central determination server 1054 can send a prize amount associated with the win to the gaming machine with the winning pattern. This prize amount can be displayed on the gaming machine and the credits associated with the prize amount can be deposited on the gaming machine. For example, win of a bingo game on gaming machine 1064 can result in a prize amount being displayed on the main display. Further, the prize amount can be deposited as credits on the gaming machine 1064 such that the credits are available for additional game play.

In one embodiment, the prize amount can be output to look like a slot game. For example, if the prize amount is ten credits. Video reels can be displayed spinning on a main display of the gaming machine and a reel combination associated with a ten credit win in a slot game can be output to the display screen. If the outcome to the bingo game on a particular gaming machine is no award, then the video reels can be displayed spinning and a reel combination associated with no award in the slot game can be displayed on the gaming machine. This process can be repeated on various participating gaming machines, as number draws for various bingo games are initiated and completed on the central determination server 1054.

The local progressive server 1056 can be used to generate one or more progressive prizes that are limited to a local group of gaming machines, such as only the gaming machines in bank 1052*b*. When games are played on the gaming machine in bank 1052*b*, an amount of each wager can be contributed to one or more progressive prizes. The local progressive server can receive the contribution amounts from the gaming machines linked to the progressive game and can keep track of the prize amounts associated with the one or more progressive prizes. The prize amounts for the one or more progressive prizes can be output to displays on the participating gaming machines as well as to separate displays near the participating gaming machines.

The local progressive server 1056 can be configured to receive information regarding gaming events on the participating gaming machines. For example, the local progressive server 1056 can be configured to receive a notification from each of the participating gaming machines when a game outcome has occurred associated with a win of a progressive prize. In other examples, the local progressive server can be configured to receive gaming information, such as when each game is played on one of the participating gaming machines, an amount of wagered for each game and when one or more type of game outcomes occur on each of the gaming machines.

The gaming information associated with gaming events on the one or more gaming machines can provide a basis for additional bonus scenarios. For example, a bonus award can be triggered on one of the gaming machines after a random number of games are played on the gaming machines as a group. As another example, a bonus award can be triggered on one of the gaming machines after a particular game outcome occurs a random number of times on the participating gaming machines as a group, such as a particular combination of symbols appearing a random number of times.

The wide area progressive server 1058 is connected to the gaming machines in bank 1052*c* and display 1066. The wide area progressive server 1058 can be used to enable a progressive game played on gaming machines distributed over a wide area, such as multiple casinos distributed within a state. Similar to the local progressive server 1058, when wagers are made, the wide area progressive server 1058 can receive contributions to the progressive prize from the participating gaming machines. The wide area progressive server 1058 can report these contributions to a remote device which tracks the total progressive jackpot. Further, if a progressive jackpot is won on one of the gaming machines to which it is connected, the wide area progressive server 1058 event can be reported to the remote device. Yet further, the wide area progressive server 1058 can receive a current progressive jackpot amount from the remote device. The current progressive jackpot amount can be reported on displays on the gaming machines participating in the progressive jackpot and/or nearby signage, such as 1068.

An exemplary display 1068 of yet another gaming machine or other display device (e.g., wide area display device) can have a digital sign controller 1070. The digital sign controller 1070 can have a network interface which allows it to communicate with a remote device, such as the wide area progressive server 1058. In this example, the digital sign controller 1070 can be configured to output information to display 1068 associated with the progressive game, such as a current jackpot amount.

In general, displays with digital sign controllers can be provided through out a gaming environment, such as casino. The digital sign controller, such as 1070, can be configured to communicate with a remote device. The remote device can be configured to send information to the digital sign controller to output to a display. The information can include video, audio and picture data. Further, the remote device can be configured to send commands to the display, such as a command to output information to the display. In one embodiment, the wide area display devices (e.g., 1068) may provide announcements of when particular gaming machines (e.g., 1002) in the local area have awarded beyond a predetermined threshold number.

The slot accounting system portion of server 1060 can receive accounting information from each of the gaming machine in system 1050, such as an amount wagered for each game and amounts awarded on each gaming machine and/or the number of further extra gains awarded due to initially settled upon outcome combinations (e.g., K, A, J, Q) and follow up bonus award opportunities. The server 1060 can also receive information which uniquely identifies each gaming machine including a machine ID number and a current game being played on the gaming machine. The accounting information can be used for auditing purposes.

The player tracking system portion of server 1060 can track the game play of individual users. For example, a player can input account information into one of the gaming machines that is associated with a player tracking account that has been previously set-up. Based on the account information, a particular player tracking account can be located. The player tracking account can include information which identifies an individual user, such as user 1062*a* (User 1062*a* can be playing games at one of the gaming machines in bank 1052*a*). The player tracking account information can include a player's name, address, phone number, gender, etc. It is to be understood that the graphics presentations on any given gaming machine can be structured for entertainment and heightened emotions and/or expectations of not only the primary player 1062*a* but also for that of nearby other persons 1062*b*.

In one embodiment, a player, such as user 1062*a*, can insert a player tracking card in a card reader (e.g., see card reader 1022 in FIG. 1). The card reader can read player tracking account information from the player tracking card, such as on a magnetic strip on the card, and send the information to the player tracking/slot account system server 1060. Based upon the received player tracking account information, the player tracking system portion of server 1060 can locate a player tracking account.

The player tracking account information can be input via other means on the gaming machine. For example, as shown in FIG. 1, the gaming machine 1002 may be able to communicate with a mobile device, such as 1006. Thus, in one embodiment, the gaming machine 1002 may be configured to directly receive player tracking account information from a mobile device. In another embodiment, the gaming machine 1002 may be configured to generate an input interface on a touch screen display that allows a player to input player tracking account information.

After the player provides account information and an account is located, the player tracking system can enter accounting information associated with a player's game play into the identified player tracking account, such as an amount wagered over time. As described above with respect to FIG. 1, the accounting information associated with a player's game play can provide a basis for awarding comps to the player. For example, based upon a player's previous game play, the player tracking system portion of server 1060 can send an amount credits to the gaming machine on which the player is playing. In another example, the player tracking system portion of server 1060 can send a command to a printer (e.g., see 1022 in FIG. 1) on the gaming machine on which the player is playing to print out a ticket. The ticket can be redeemable for goods or services or a discount on goods or services, such as a free meal or discount a meal.

As described above, each of the gaming machines can be coupled to a ticket-in/ticket out (TITO) server 1062. TITO server 1062 can be used to generate and validate instruments associated with a credit and/or cash value. One example of an instrument, which can be generated and validated, is a printed ticket. Another example is a digital instrument, such as a printed ticket stored in a digital form. In one embodiment, a digital instrument can be stored on an electronic device carried by a user, such as a mobile device carried by user 1062*a*.

As an example, when a printer, such as 1022, is employed in a "cash out," the gaming machine controller (e.g., see 1160 in FIG. 8) can contact a TITO server (e.g., see 1062 in FIG. 2) with a cash out amount. In response, the TITO server can generate a unique number, associate the unique number with a value and send the gaming machine a unique number.

The unique number can be sent to a printer (e.g., see printer 1022 in FIG. 1). Then, the printer can print a ticket with the unique number, such as a unique number encoded in a bar-code, and a value of the ticket, such as five dollars.

When the ticket is later presented for redemption, the unique number can be used to validate the ticket. For example, the user 1062*a* can "cash out" at a first gaming machine, such as 1064 in bank 1052*a*, and receive a printed ticket with a unique number generated by the TITO server 1062. Then, the user 1062*a* can go to a gaming second gaming machine, such as 1066 in bank 1052*c*, and insert the ticket into a bill acceptor (e.g., see 1024 in FIG. 1). The second gaming machine 1066 can contact the TITO server 1062 and send the ticket information, i.e., the unique number read from the ticket, to server 1062. Then, the server 1062 can validate the ticket and send back to the second gaming machine 1066 an amount of credits to deposit on the second gaming machine. The deposited credits can be used for additional game play.

In these examples, the servers can include processors, memory and communication interfaces. Various gaming functions are associated with each of the servers, 1054, 1056, 1058, 1060 and 1062. The described distribution of gaming functions is for the purposes of illustration in only. In alternate embodiments, combinations of gaming functions can be combined on the same server or repeated on different servers. For example, the central determination server 1054 can also be configured to provide a local progressive to the bank of gaming machine 1052*a*. In another example, the local progressive server 1056 can be configured to provide a number of different progressive prizes for different groups of gaming machines. In yet another example, the player tracking system portion of server 1060 can be configured to provide bonusing features at each of the gaming machines.

In FIG. 2A, while gaming machines, such as those of displays 1064 or 1066, are operational, a user such as 1062*a* can engage in game play. Under some conditions, such as tilt conditions, game play can be suspended and an intervention by an operator, such as 1065, may be required. An operator intervention may require an operator, such as 1065, to be directly present at a gaming machine, such as that of display 1064. For example, the presence of an operator may be required to access an interior of the gaming machine to clear a tilt condition. In other examples, an operator may be able to clear a tilt condition from a remote location via a near field or other communication coupling with the gaming machine (e.g., using a mobile device such as 1006).

In one embodiment, during game play, the gaming machine can award an amount above some threshold amount. Prior to receiving the award, an operator, such as 1065, can be sent to the gaming machine to have the player fill out a form for tax purposes. In the United States, this tax form is referred to as a W2G form. In addition, the operator may verify that the gaming machine was operating properly when the award was made prior to the player receiving the award. For example, if the gaming machine indicates a progressive jackpot has been won, the operator may check to verify the gaming machine was operating properly. In a hand pay, the operator, such as 1065, may provide an instrument redeemable for the jackpot amount.

As described above and in more detail with respect to FIGS. 1, 2A, 5 and 6, an operator, such as 1065, may be required to be physically present at a gaming machine, such as 1064 and 1066, to clear a tilt condition. For example, to clear a tilt condition, the operator, such as 1065, may have to access an interior of a gaming machine to clear a paper jam in a printer or a bill acceptor (e.g., see printer 1022 and bill acceptor 1024 in FIG. 1). In another example, to clear a tilt condition, the operator 1065 may have to access an interior of the gaming machine, such as 1064, to add more tickets to a ticket printer or empty a note stacker associated with the bill acceptor. For some tilt conditions, the gaming machine operator 1065 may access a menu output on a main display of the gaming machine, such as 1064 or 1066, to perform a RAM clear. RAM clears are described in more detail below with respect to FIG. 5.

As earlier mentioned, the various data processing devices (e.g., 1054-1064) in the network services providing block 1004 and in the individual slot or other software driven gaming apparatuses (e.g., 1052a-1052c) or combinations thereof are generally dependent on called upon and executed software programs (not individually shown). A conventional installation of one or more software programs may proceed as follows. One or more software coding persons or code updating persons 2012 generate corresponding pieces of source code 2014. The generated source code or codes 2014 is compiled by an automated compiler 2015. Installable object codes 2016 produced by the compiler 2015 are transmitted to a build assembler 2020. The build assembler 2020 creates an installation build from the received object codes 2016 and transmits the installation build to an appropriate automated software installer 2030. At install time, the software installer 2030 automatically copies the to-be-installed object codes 2016 into one or more respective portions of the network services providing hardware 1004 and at the same time generates respective SHA-1 hashes of respective segments of the being-installed object codes 2016. The generated SHA-1 hashes are automatically stored into corresponding records within a database server 2050.

After installation, an automated software verifier 2040 is activated and used for comparing hashes of the installed software segments (which should be the same as corresponding segments of the compiled code 2016) against the respective hashes that had been stored in the database server 2050. If all of the compared hashes match, then the installed software segments are deemed ready to be run (executed) within the network services providing hardware 1004 and/or in whatever destination data processing units (e.g., in respective ones of gaming apparatuses 1052a-1052c) they are predestined to be transmitted to by way of a secured transmission mechanism (not shown). In one embodiment, each time new or updated software is to be installed in the network services providing hardware 1004, a government official 2010 or other authorized agent/inspector authorized to do so, is called in to oversee the installation process and to obtain as an output of the software installer 2030 of its generated SHA-1 hashes in the form of a GLI certification letter 2011 that is in compliance with the latest government requirements and includes an unalterable copy of the SHA-1 hashes created for the respective segments of the received and installed object codes 2016.

Thereafter, the government official/agent 2010 may return at any time to run the software verifier 2040 for the purpose of accessing respective segments of the installed object codes (2016) within the network services providing hardware 1004 and automatically generating SHA-1 hashes for those accessed respective segments of the installed object codes and then comparing (2009) the generated hash values against the SHA-1 hashes in the GLI certification letter 2011 to thereby verify that nothing has changed.

It is generally in the interest of the casino to also run the software verifier 2040 for the purpose of obtaining automatically generated SHA-1 hashes for respective segments of the installed object codes (2016) within the network services providing hardware 1004 before those respective segments are allowed to execute (e.g., each time one or more of the respective segments is called upon) and comparing them against the SHA-1 hashes in the database server 2050 to thereby verify on a more frequent basis that nothing has changed. If the automatically generated hashes produced by the casino's software verifier 2040 match the database's SHA-1 hash values, then an OK to proceed signal 2004 is fed back to the network services providing hardware 1004 to allow the latter to run or download to a gaming machine (e.g., 1002) the respective executable.

Although the above procedure provides a certain level of securitization, a motivated hacker 2013 may nonetheless still find ways of at least temporarily installing malicious code for altering the way that the system is supposed to run. In one example, the hacker 2013 gains access to both of the database server 2050 and the network services providing hardware 1004. The hacker 2013 then inserts appropriate hash values into the database server 2050 for malicious code (code not explicitly shown) that is then inserted (e.g., by a malicious software installer—not shown) into the network services providing hardware 1004. When the casino's automated software verifier 2040 is next activated in response to a call for a piece of the installed code (e.g., the installed malicious code), the casino's verifier 2040 will find the matching hash value stored in the database server 2050 and then allow (by way of OK to proceed signal 2004) the malicious code to execute. As a result, the casino may then incur losses before the installation of the malicious code is discovered, for example the next time the government inspector/agent 2010 pays a visit and checks (2009) the hashes of the installed code against the GLI certification letter 2011.

In another and more devious attack, the hacker 2013 need gain access only to the automated software installer 2030 at install time. The hacker 2013 pauses the installation in its starting phase and swaps out the original installation code for the original build codes (those produced by build assembler 2020) and replaces the latter with his own installation codes. Thereafter the hacker 2013 allows the paused installation to proceed. The un-paused software installer 2030 will then generate SHA-1 hash values matching the hacker's installation codes and store those in the database 20250 as well as writing them into the GLI certification letter 2011. If this more devious attack is used, even the government inspector/agent 2010 will not discover it the next time that government inspector/agent 2010 pays a visit and checks (2009) the hashes of the installed code against the GLI certification letter 2011. Rather than greedily going directly for the progressive jackpot prize, such a devious hacker 2013 may slowly siphon off the casino's coffers by way of smaller yet significant other prize awards.

Figure 2B:
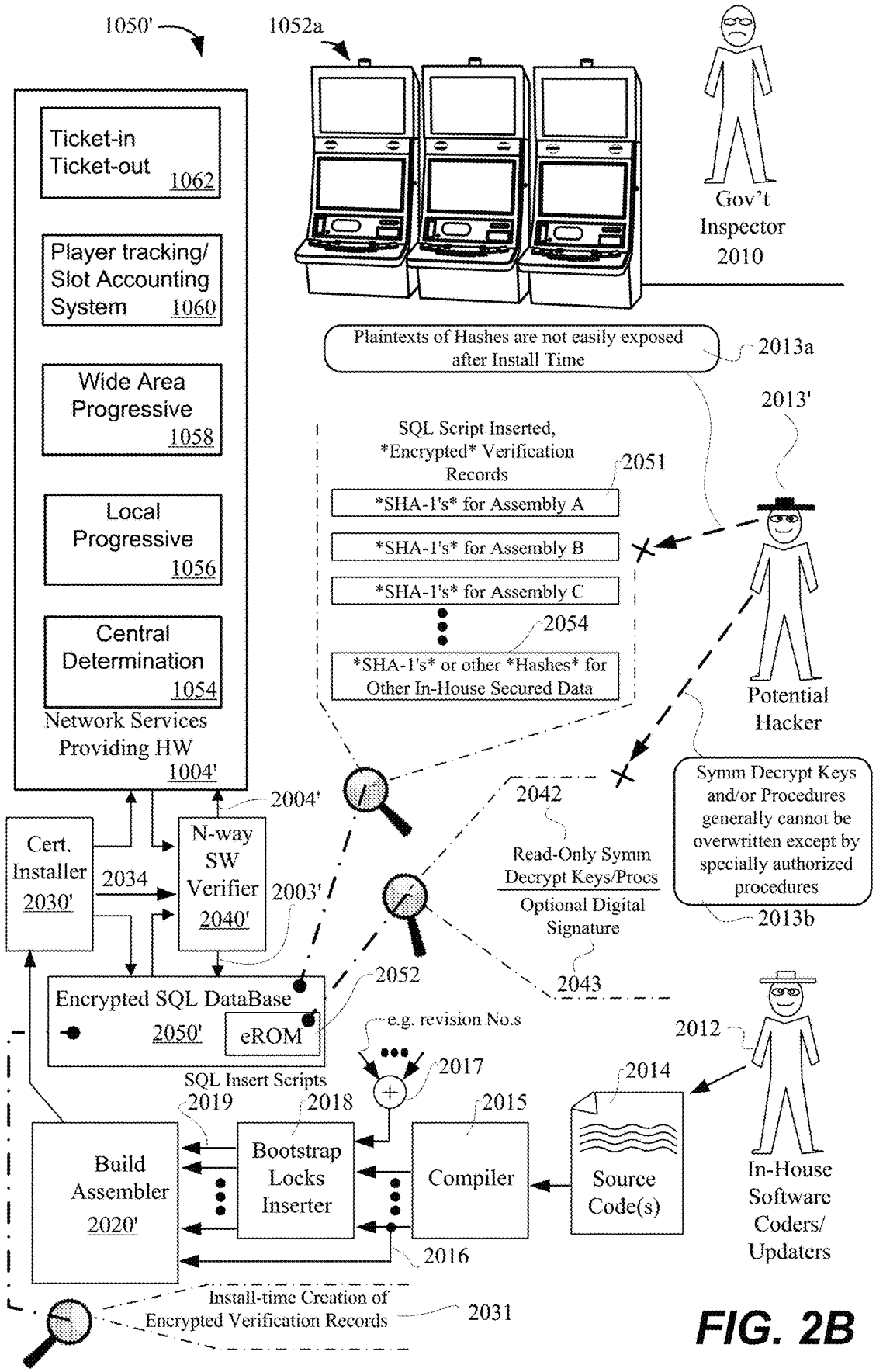
FIG. 2B illustrates part of the gaming system of FIG. 2A including an improved securitization subsystem and process in accordance with the present disclosure.

Referring to FIG. 2B, shown is a modified system 1050' in accordance with the present disclosure. A bootstrap locks inserter 2018 is interposed between the compiler 2015 and the build assembler 2020'. The interposed bootstrap locks inserter 2018 automatically generates SQL insert scripts 2019 for automatic execution by a certified installer 2030'. The automatically executed scripts 2019 cause the installer 2030' to automatically send SQL instructions to an encrypted SQL database server 2050' at install time. The automatically sent SQL instructions make use of pre-stored procedures within the encrypted SQL database server 2050'. At least one of the used procedures causes the server 2050' to automatically generate one or more symmetric encryption keys (and/or other symmetric encrypting devices; e.g., using an SQL transaction command such as CREATE SYMMETRIC KEY), to receive respective hashes (e.g., SHA-1's) of and/or other verification records for identified code/data segments from the certified installer 2030' at install time, to encrypt those received hashes/other verification records with corresponding ones of the one or more generated symmetric encryption keys/symmetric encrypting devices and to store the encrypted versions (e.g., symmetrically encrypted versions) of the installer generated hash values into a first portion (2051-2054) of the database server 2050'. The used procedures also cause the server 2050' to automatically store the corresponding decrypt keys/devices (e.g., symmetrical decryption keys) into an essentially read-only second portion 2052 (eROM) of the database server 2050'. (As elucidated below, essentially read-only means either truly read-only or writable/overwriteable into only after an overwrite attempting procedure or device presents predetermined authentication tokens and/or other authentication credentials that are pre-specified as being required to get write permission and/or write capability for writing into or overwriting into the essentially read-only second portion 2052.)

As used here, the term symmetric encryption key/device covers various means for quickly encrypting respective code segments and/or data segments such that the symmetrically encrypted code/data segments can be quickly decrypted. This includes use of the well-known Boolean XOR function where the same key is combined with the plaintext using the exclusive OR function to flip key-selected bits and thus produce the ciphertext and then the same key is combined with the ciphertext using the XOR function to reproduce the plaintext. Alternatively or additionally, positions of bits and/or bytes within the plaintext can be swapped for purpose of encryption and then re-swapped about the same positions to quickly reproduce the plaintext. Alternatively or additionally, nonsense bits and/or bytes (e.g., randomly generated ones) can be inserted at predetermined bit and/or byte positions and then removed from those predetermined bit and/or byte positions to quickly reproduce the plaintext. (A procedure sometimes referred to as hiding in plain sight.) Alternatively or additionally, various combinations of such symmetric encryption/decryption devices may be employed. For example, do position swapping first and then apply XOR with a key for encrypting. When decrypting, do the XOR first and then the position swapping. As used here, use of symmetric encryption key/device also covers the on-the-fly programming of a reprogrammable hardware or firmware device such as an FPGA for quickly carrying out symmetric encryption/decryption.

As used here, the term essentially read-only portion (eROM) applies to one or more various means for making it difficult for a potential hacker (e.g., 2013') to alter the symmetric encryption/decryption keys and/or procedure identifications stored in section 2052 (eROM) of the database server 2050'. (In one embodiment, one or more of the identified decryption procedures is also stored in eROM section 2052.) The function of making it difficult for a potential hacker to alter or add to the contents of the eROM 2052 may include use of special read/write access permissions and/or authentication tokens/procedures. For example, in one embodiment, the secure database server 2050' requires that the installer 2030' first provide an authentication token and/or authentication certificate to the database server 2050' (or have a proxy server do so) before granting the installer 2030' permission to call on various predetermined procedures within the secure database server 2050' including that of causing the symmetric encryption/decryption keys and/or procedure identifications to be stored in or erased from section 2052 (eROM) of the database server 2050'. Thus a hacker (e.g., 2013') who cannot provide the necessary authentication token and/or authentication certificate (e.g., one digitally signed by a private key) to the database server 2050' is blocked from getting write permission for overwriting any of the encryption/decryption keys and/or procedure identifications or procedures stored in eROM section 2052. Alternatively or additionally, the encryption/decryption keys and/or procedure identifications stored in section 2052 may be automatically covered by a digital signature 2043. Typically such a digital signature 2043 is a hash of the other data 2042 stored in eROM section 2052 and encrypted with an asymmetric private key. Then anyone with a copy of a public key can verify that the data 2042 covered by the digital signature 2043 has not been altered. In one embodiment, a modified verifier 2040' in accordance with the present disclosure automatically and repeatedly asks the secure database server 2050' to validate the data 2042 in eROM section 2052 using the public key. As used here, the term eROM for section 2052 is not limited to Read-Only-Memory although such an option is not precluded where the encryption/decryption keys and/or procedure identifications are written to a write-once and subsequently read-only form of data storage. More generally though, any appropriate form of high speed data storage may be employed (e.g., FLASH memory) where the integrity of the stored data can be easily verified (e.g., with digital signature and/or CRC check) and it is relatively difficult if not impossible for unauthorized hackers (e.g., 2013') to alter that stored data 2042.

As indicated in FIG. 2B, the compiler outputs 2016 are input into the build assembler 2020' together with the SQL insert scripts. The build assembler 2020' then inserts corresponding parts into the automated installer 2030' and the latter (2030') automatically installs the compiled code segments 2016 into the connected network services providing hardware 1004', simultaneously generates corresponding verification records such as those including hashes (e.g., SHA-1's) and simultaneously executes the SQL insert scripts 2019. The automated and simultaneous carrying out of these steps makes it difficult for a hacker (e.g., 2013') to intercede in these activities. In one embodiment, a maximum install time is pre-specified and automatically checked for at the end of the install. This makes it difficult for a potential hacker (e.g., 2013') to pause the process and interfere with it without going unnoticed.

In one embodiment, the in-house generated SQL insert scripts 2019 (preferably generated inside a secured facility where the source code is also created) also cause the script executing installer 2030' to carry out an authentication handshake with the secure database server 2050'. The authentication handshake may include provision of authentication tokens and/or certificates to the secure database server 2050' by the installer 2030' and/or by a proxy server that provides authentication on behalf of the script executing installer 2030'. (For example, the scripts may include automated contacting with a proxy server for providing the authentication tokens/certificates.) In one embodiment, the SQL insert scripts 2019 automatically self destruct after completion of their tasks is signaled. This makes it difficult for a potential hacker (e.g., 2013') to get hold of the scripts, decipher them and then later try to mimic their functions.

In one embodiment, the in-house generated SQL insert scripts 2019 also include presentation by the installer 2030' of respective identifying and authenticating certificates (e.g., ones digitally signed by respective private keys) for each of the to-be-installed code segments and/or data segments. The certificates may include unique names and/or other such identifications for the respective to-be-installed code segments and/or data segments. The SQL insert scripts 2019 may then call upon the secure database server 2050' to associate the certificate provided unique names/identifications for the respective to-be-installed code segments and/or data segments with their respective, encrypted verification records 2051-2054 and their respective, read-only decryption keys and/or procedures 2042. In one embodiment, trusted communication path 2034 is used to pass on authentication tokens/certificates for accessing the database server 2050' and the respective identifying and authenticating certificates for each of the installed code segments and/or data segments to a verifier 2040'. It is to be understood that although verifier 2040' and installer 2030' are illustrated as being outside of the inter-coupled network services providing hardware 1004' for sake of explanation here, at least the verifier 2040' may be an integral part of the network services providing hardware 1004' because in one embodiment, the verifier 2040' is automatically and repeatedly called upon to validate installed code or data when that installed code or data is about to be used in a transaction that needs pre-validation. The verifier 2040' then automatically contacts the database server 2050' (by way of path 2003'), supplies its authentication tokens/certificates and requests a plaintext copy of the hash and/or other verification record of an identified item of already-installed code or data from the database server 2050'. The database server 2050' responds by accessing the corresponding encrypted hash (and/or other corresponding verification record) in memory section 2051-2054, accessing the corresponding read-only decryption keys and/or procedures 2042 out of eROM section 2052, decrypting the corresponding encrypted hash, and returning the decrypted hash to the requestor (e.g., verifier 2040').

As indicated at 2017, the bootstrap locks inserter 2018 need not be limited to bootstrap installing of compiled and executable code segments 2016. In one embodiment, one or more of various other data (e.g., control data) may be installed at install time into the network services providing hardware 1004' and later have validity of the installed data verified by use of the verifier 2040' and of the secure database server 2050'. More specifically, it is within the contemplation of the present disclosure to generate integrity validating hashes for numerous types of data at install time where the secure database server 2050' stores encrypted versions of those hashes and is later used to serve up the plaintext of the hashes to authorized verifiers (e.g., verifier 2040'). The integrity validating hashes need not be SHA-1's and could be instead other hashes usable by the verifier to validate the corresponding data depending on the nature of the to be validated, installed data. Such installed, hash covered and later validated may include, but is not limited to: (1) Jenkins™ build numbers for respective code installs (Jenkins™ is a commercially available cross-platform continuous integration and continuous delivery application used to build and test software projects); (2) subversion revision numbers for respective code installs; (3) identifications of to-be automatically monitored directories within the data stores of the network services providing hardware 1004'; (4) identifications of to-be automatically monitored TCP ports of the network services providing hardware 1004' (TCP is short for Transmission Control Protocol) and (5) identifications of to-be automatically monitored UDP ports of the network services providing hardware 1004' (UDP is short for User Datagram Protocol). In the case of the latter items (3)-(5), various further security procedures may be installed in the network services providing hardware 1004' where those security procedures automatically and repeatedly monitor pre-specified items within or connected to the network services providing hardware 1004', including, but not limited to, specific file directories and/or files, specific UDP ports and specific TCP ports. For example, the above-cited U.S. Ser. No. 15/787,649 provides for automated monitoring and/or selective more stringent monitoring of pre-specified ports by automatically repeated watchdogging of those ports. The specification of which ports are to be watched can be secured by one or more of the techniques disclosed herein. More specifically, in accordance with one aspect of the present disclosure, authorized verifier 2040' is authorized to request from the secure database server 2050' and receive therefrom the plaintext hashes for respective items such as the above specified items (1)-(5). The verifier 2040' is programmed to automatically and repeatedly (e.g., periodically) validate that the hashes of one or more of above specified items (1)-(5) have not changed and send alarms to pre-specified entities in case they have. This helps to assure that potential hackers (e.g., 2013') do not change security providing items including for example the to-be automatically repeatedly monitored directories, files and ports of items (3)-(5). Therefore in accordance with one aspect of the present disclosure, the bootstrap locks inserter 2018 is configured to test for the presence of additional inputs at 2017 such as one or more of the above specified items (1)-(5) and to generate SQL insert scripts (2019) for these together with respective data segment identifying certificates for each. The SHA-1 and/or other hashes for these additional inputs 2017 are then stored in encrypted form by the secure database server 2050' as indicated at 2054.

Figure 3A:
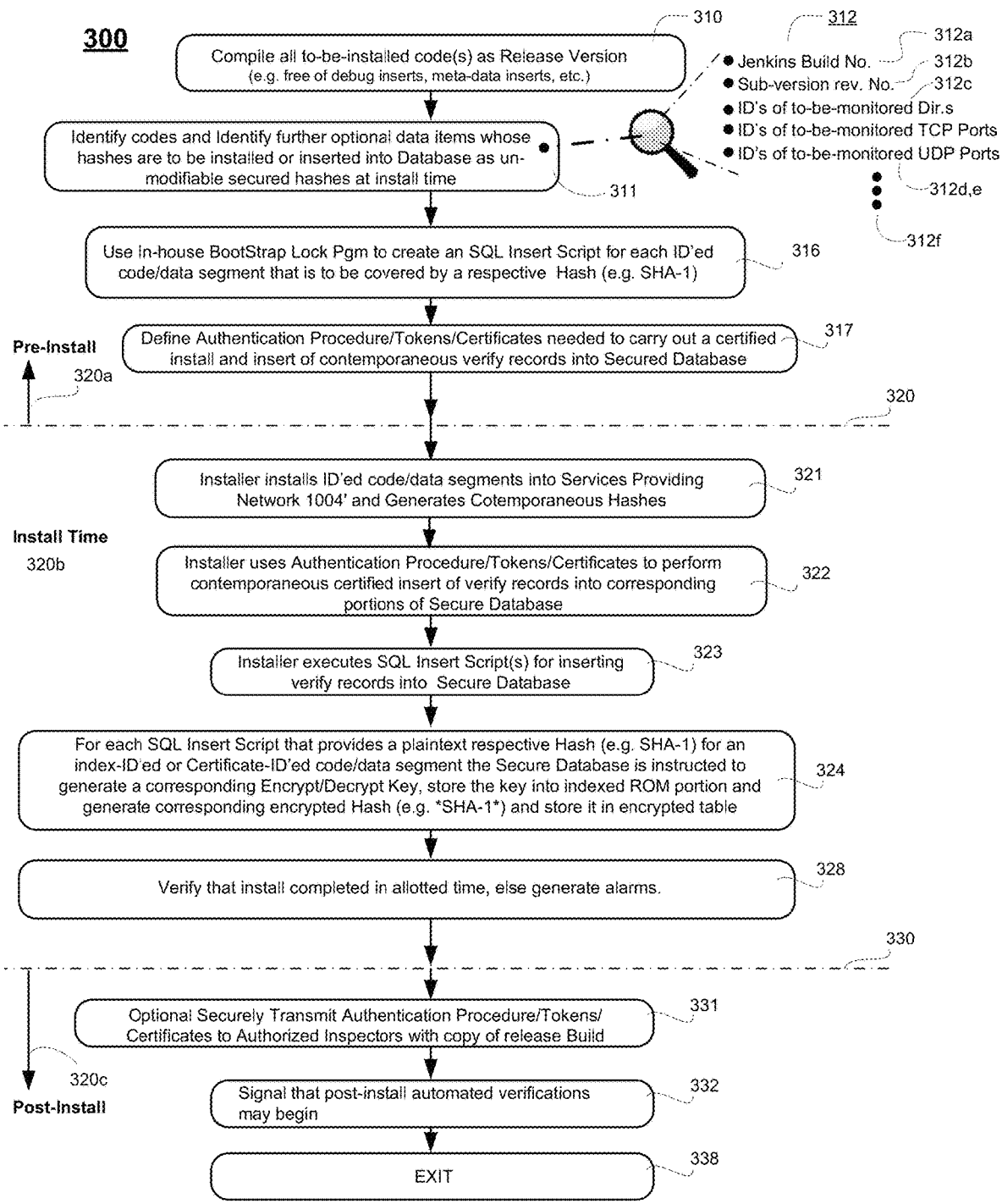
FIG. 3A depicts a machine-implemented method of securely installing segments of code and/or data in accordance with the present disclosure.

Referring to FIG. 3A, shown is a machine-assisted process 300 that includes a pre-install phase 320a, an install time phase 320b and a post-install phase 320c.

At step 310 within the pre-install phase 320c, all to-be-installed code segments are compiled as release versions. Such release versions are the final production versions, meaning they are free of debugging inserts (e.g., breakpoints, log points etc.), meta-data inserts and so on.

At step 311 unique identifications (e.g., identifying and authenticating certificates) are established for each of the to-be-installed code segments (e.g., 2016 of FIG. 2B). Optionally, further unique identifications are established for each of additional data segments (e.g., 2017 of FIG. 2B) that are also to be installed and to have their respective hashes installed or inserted into the secure database as on modifiable secured hashes at install time (during subsequent install phase 320b). As indicated at 312, the additional data segments may include one or more of the items (1)-(5) described above, namely, the Jenkins build number 312a, subversion revision numbers 312b, identification of to be monitored directories and/or files 312c, identifications of to be monitored TCP ports 312d and identifications of to be monitored UDP ports 312e. Ellipses 312f indicate that the list is a nonexhaustive one and further to be installed and hash covered data segments may be included.

At step 316, an in-house bootstrap locking program is used (e.g., within a same secured facility in which of the release version codes are compiled) to create respective SQL insert scripts for each of the respectively identified compiled code segments and/or data segments that are to be covered by respective hashes (and/or other verification devices) at least during post-install verification phases. As explained above, each respective SQL insert script is automatically executed by the installer 2030' such that a respective one or more encrypted verification records (e.g., 2051-2054) are recorded in respective encrypted tables of the secure database 2050' and such that respective decryption keys and/or decryption procedure identifications are stored in the read-only section 2052 of the secure database 2050' and cross associated with the identified code segments and/or data segments and with the respective decryption keys and/or decryption procedure identifications.

At step 317 within the pre-install phase 320a, various authentication procedures, authentication tokens and/or authentication certificates are defined or obtained for carrying out a certified install and insert based on authorized cooperation between the certified installer 2030' and the secure encrypted SQL database server 2050'. In one embodiment, the certified installer 2030' is required to provide to the database at least one of the defined or obtained authentication tokens and/or authentication certificates with use of the corresponding authentication procedures in order to be allowed to instruct the secure encrypted SQL database server 2050' to store the encrypted verification records into encrypted tables section 2051-2054 and to store the corresponding decryption keys and/or decryption procedures into read-only section 2052.

Dividing line 320 indicates the beginning of the install time phase 320b. Preferably, all of the steps in the install time phase 320b are carried out automatically and quickly under control of respective scripts executed by the installer 2030' and within a predetermined maximum amount of time. If that predetermined maximum of amount of time is exceeded, and install error alarm is transmitted to responsible entities (human and/or automated) so that they will investigate why the install process exceeded its allotted predetermined maximum amount of time.

In step 321, the installer installs the identified code segments and/or data segments into the services providing network 1004' and contemporaneously generates the respective hashes (e.g., SHA-1's and/or others) and/or other integrity verification devices for the installed segments as each is installed.

At steps 322-324, the installer uses whatever authentication procedures, tokens or certificates are required by the secure database to perform the contemporaneous certified inserts of the corresponding verification records into corresponding portions of the secure database. The specifics of each insert of a corresponding verification record is controlled by the respective SQL insert script as automatically executed by the installer 2030'. As indicated in more detail for step 324, each respective installer-executed SQL insert script causes the installer to provide to the database the contemporaneously generated hash for a correspondingly identified assembly (e.g., a code assembly and/or a data assembly) as soon as the identified assembly is installed. The SQL insert script also causes the installer to provide one or more corresponding unique identifications of the installed assembly to the database. The unique identifications may, in the form of unique index numbers and/or unique identifying certificates for the respective assemblies. The SQL insert script further causes the installer to instruct the secure database 2050' to cross associate one or more of the unique assembly identifications with the contemporaneously generated plaintext of the hash, to generate or otherwise obtain a respective symmetric encryption key and/or symmetric encryption procedure for encrypt eating that hash, to encrypt the hash and store it in an encrypted database table that cross-references back to the unique assembly identification and to save the respective symmetric encryption key and/or symmetric encryption procedure in the read-only section as co-associated with the unique assembly identification.

Step 328 is optional and is executed at or near the end of the install time phase 320b. A real time clock is checked both at the beginning of the install time phase (e.g., in step 321) and at the tail end (e.g., step 328) to assure that a potential hacker has not somehow paused the automated install process and try to insert malicious code and/or data into the process. If it took the install process more than a predetermined allotted time to complete, step 328 transmits appropriate alarms to predetermined entities (human and/or automated) to alarm down to the fact that the install took more time than allotted, how much more time it consumed and for installation of what items of data and/or code.

Line 330 represents the separation between the install time phase 320b and a post-install phase 320c. Step 331 is optional and may be used to signal authorized entities such as authorized inspectors that the build has been installed. In one embodiment, step 331 securely transmit its authentication procedure identifications and/or tokens and/or certificates to authorized persons with a copy of the release build (including identifications of its respective hash-covered segments).

Machine-implemented step 332 automatically signals various verification procedures that the install has occurred and that they may now begin performing their automated verification operations as appropriate. This signaling may securely transmit to the respective verification procedures, respective authentication procedure identifications and/or tokens and/or certificates as needed by them to access of the secure database 2050' and obtain plaintext verification records (decrypted after being fetched from record storing area 2051-2054) for use in their respective verification operations.

Figure 3B:
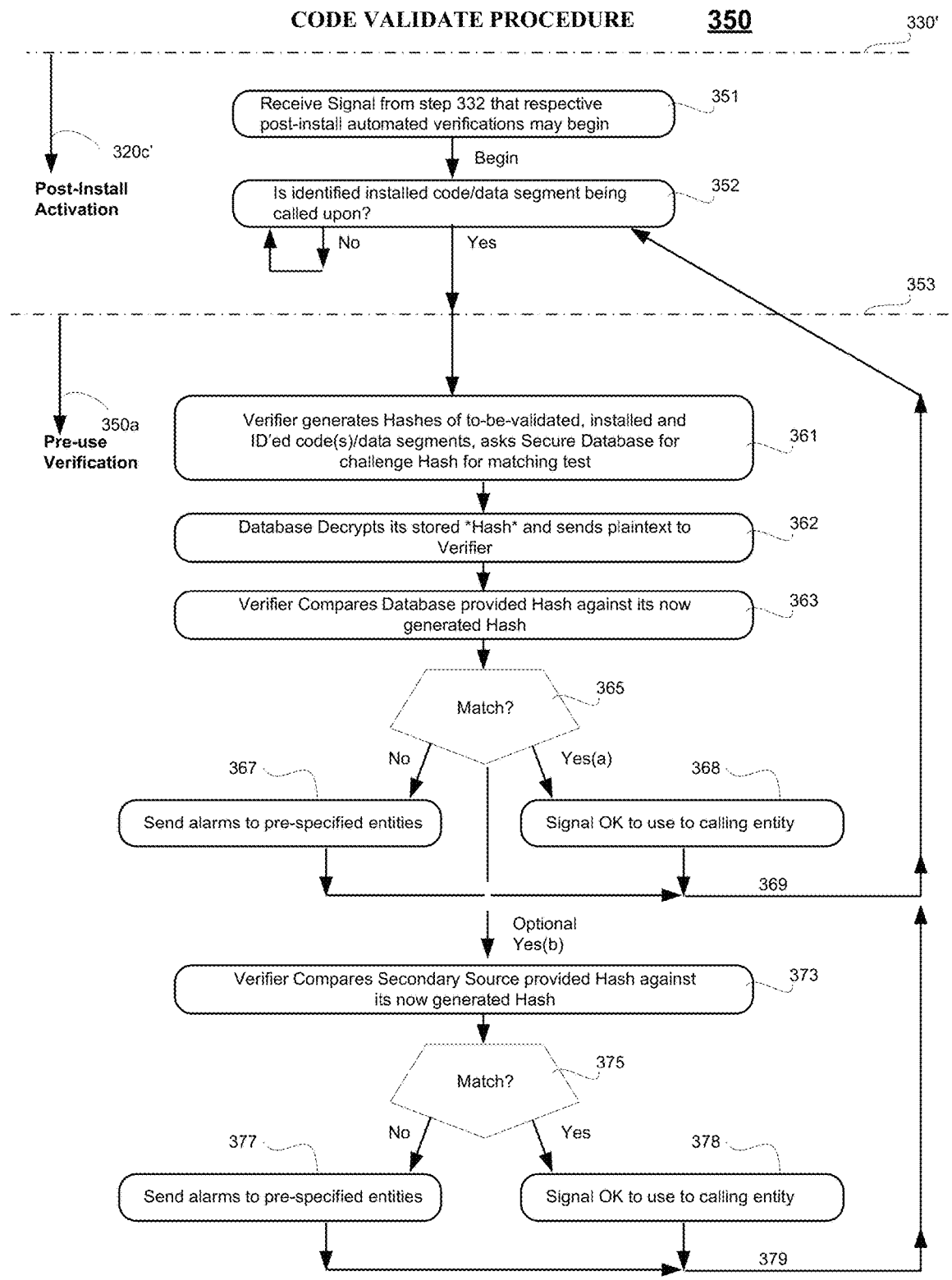
FIG. 3B illustrates a machine-implemented method of securely validating installed segments of code and/or data in accordance with the present disclosure.

Referring next to FIG. 3B, a machine-implemented process 350 is illustrated which makes use of the encrypted verification records stored in the secure database 2050'. Step 351 occurs roughly at the same time as step 332 of FIG. 3A. After a respective install completes, the code validate procedure 350 receives a post-install activation signal from the installer at step 351 indicating that post-install automated verifications for the installed code segments and/or data segments may begin. The post-install activation (also referenced as 320c') may include secured transmission to, and receipt by the respective verifier mechanism (e.g., 2040' of FIG. 3A) of required code segment identifications, authentication tokens, authentication procedure identifications and/or certificates needed for interacting with the secure database 2050' to perform the corresponding verification operations.

Line 353 demarks a separation between the post-install activation phase 320c and one or more pre-use verification operations 350a. At step 352 the verifier (e.g., 2040' of FIG. 2B) waits to receive a verification request from an entity within or controlled by the services providing network 1004' for verification of respective an identified ones of installed code segments and/or installed data segments prior to their use. In one embodiment, the requests are automatically generated for all vital pieces of installed code segments and/or installed data segments prior to their use. If no request is received, the verifier idles at step 352. If yes, control passes to pre-use verification step 361.

In step 361, the verifier uses the received identification of the to-be-verified code segments and/or data segments for generating one or more respective hashes of those segments. The verifier also uses the received identifications for sending corresponding requests (e.g., by way of path 2003' in FIG. 2B) to the secure database server 2050' for return of respective challenge hashes.

At step 362 the database server decrypts its stored, encrypted version of the challenge hash (*Hash*) and returns the decrypted plaintext (Hash) to the verifier. Then, in step 363 the verifier compares the database provided hash value against the verifier's generated hash value to test for a match as indicated in subsequent step 365. If there is no match, then control passes to step 367 where appropriate alarms are generated and sent to prespecified entities (human and/or automated). If there is a match, then according to one embodiment (option Yes(a)), control passes to step 368 where an okay to use signal is sent to the verification requesting entity (e.g., by way of path 2004' in FIG. 2B) and control is returned by way of path 369 to step 352 where the verifier waits for its next verification request.

In accordance with an alternate embodiment (option Yes (b)), after a first match at step 365 control passes to step 373 where the verifier obtains a secondary challenge hash value from a secondary source to test against the verifier's generated hash value. In one variation, the secondary source is a file stored outside of the secure database and symmetrically encrypted by an encryption key and/or device different from that used by the secure database 2050'. When the verifier tests its generated hash value against multiple sources of challenge hash value, it is referred to here as an N-way verifier. In step 373 the verifier compares the secondary source provided hash value against the verifier's generated hash value to test for a match as indicated in subsequent step 375. If there is no match, then control passes to step 377 where appropriate alarms are generated and sent to prespecified entities (human and/or automated). If there is a match, then according to one embodiment, control passes to step 378 where an okay to use signal is sent to the verification requesting entity (e.g., by way of path 2004' in FIG. 2B) and control is returned by way of path 379 to step 352 where the verifier waits for its next verification request. While FIG. 3B illustrates the option of serially checking the verifier's generated hash value against a primary source (e.g., the secure encrypted database server 2050') and a secondary source (e.g., a differently encrypted file), it is within the contemplation of the present disclosure that N-way verification may require matching with more than two challenge value sources and/or that the N-way verification match tests occur in parallel rather than chronologically one after the other.

Figure 5:
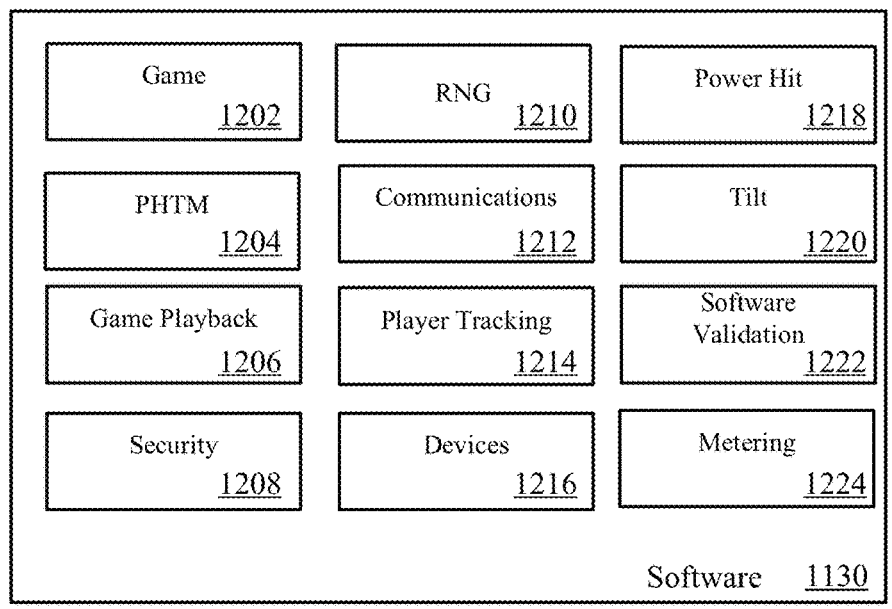
FIG. 5 illustrates a block diagram of gaming software in accordance with the present disclosure.

Referring to FIG. 4, details of a gaming machine controller that may be used to control the play of wager-based games including generating the game presentations and controlling the various gaming devices is described. FIG. 5 illustrates a block diagram of gaming machine components including a securely housed gaming machine controller (GMC) 1160. The GMC 1160 can be coupled to an external power supply 1146, displays such as 1018' 1012; etc., I/O devices 1134, external non-transient memories, such as a disk drive 1136, a power-off security device 1138, security sensors 1140, communication interfaces 1142 and meters 1144.

The external power supply 1146 can provide a DC voltage to the GMC 1160. The power supply can also provide power to the other devices in the gaming machine cabinet, such as I/O devices. Typically, the power supply 1146 is configured to receive power from an external power source, such as an AC voltage source. In some embodiments, an uninterruptable power supply (UPS) 1148 can be coupled to the power supply 1146. The UPS 1148 can be configured to provide back-up power for some time period in the event external power is lost. The GMC 1160 includes its own internal and thus securely housed battery 1124 (e.g., a rechargeable battery).

In a particular embodiment, the UPS 1148 communicates with the GMC 1160 on boot up and periodically to indicate power status and battery capacity of the UPS. If the UPS 1148 is not operational, this communication will fail and the game will display a soft tilt on the main game display, such as 1018', indicating that the UPS is not available. Under normal circumstances the UPS 1148 functions to condition the input power and ensure that the UPS battery remains fully charged. However, upon a power failure, the UPS 1148 in conjunction with the game platform will take one of two paths depending on the state of the UPS battery, which are described as follows.

If a power fail occurs and the UPS battery is more that 50% charged the GMC 1160 can immediately determine if there are credits on the machine (The threshold level can be a different percentage). If the game has no credits, the GMC 1160 can immediately hard tilt and become unplayable. The GMC 1160 can continue to run on battery power until either the battery level passes below 50% or power is restored to the game. If power is restored, the hard tilt is cleared and the gaming machine can become playable again.

If credits are on the machine, the GMC 1160 can allow game play to continue until the battery level reaches 50% charge. At that point, the GMC 1160 can complete a game in progress, cash out the player and begin an orderly shutdown. Allowing game play prior to shutting down allows the player to complete a game in progress and continue to remain on the game for a small period of time in case power is restored quickly. This keeps the game from tilting and the GMC 1160 cashing out the player for momentary glitches in power. It also allows some time for backup generators to come on line for a more serious power outage.

The power-off security 1138 can be configured to monitor the security sensors 1140 while power is off to the gaming machine, such as during a power failure or shipping. The power-off security 1138 can include its own processor, memory and power supply, such as the internal battery 1124. The power-off security device 1138 can report detected problems while the power was off to the GMC 1160 after power is restored. In some instances, a detected problem can cause a tilt condition. For example, a detected door open condition while the power was off may cause a tilt condition which has to be cleared by an operator. As another example, if the GMC 1160 can't detect the power-off security 1138, then the gaming machine can tilt.

The I/O devices 1134 can include the gaming devices that are directly or indirectly coupled to the GMC 1160 to provide the external interfaces that allow players to play the wager-based game(s) on the gaming machine. Examples of these gaming devices are described above with respect to FIG. 1. In some embodiments, a memory device 1136, such as disk drive and/or a flash drive, can be provided. As will be described in more detail below, the memory device 1136 can be used as a power hit tolerant memory (PHTM) or used to receive crucial data from another PHTM.

The communication interfaces 1142 can include wired and wireless communication interfaces, which use communication protocols, such as but not limited to Ethernet, Bluetooth™ Wi-Fi, and NFC. A schematic indication of such a wireless communication interface 1046 is shown in FIG. 1. The remote servers (e.g., each server including one or more data processing units such as CPUs and appropriate memory such as SRAM, DRAM, Flash etc.) can form and provide the network services of block 1004 as described above with respect to FIG. 1. The communication interfaces can be used to communicate with remote devices, such as remote servers, mobile devices in proximity to the gaming machine or other gaming machines. The GMC 1160 can be configured to support a variety of communication protocols over these communication interfaces.

In one embodiment, communications can be carried out with a back-end slot accounting system (SAS) (e.g., see network services block 1004 in FIG. 1). In one embodiment, the SAS protocol uses a CRC redundancy check to ensure the integrity of messages going to and from the host. All type S, M, and G Long polls are CRC'd over the entire package including the address and command byte. The SAS engine can be configured to isolate the gaming code from the external communications. The SAS engine can be configured to only accept correctly formed SAS messages. Malformed, invalid or incorrect messages can be summarily dropped. Although CRC is mentioned here as one basis for data integrity validation, it is within the contemplation of the present disclosure to use of numerous other data and code integrity validation techniques including, but not limited to, the above described hash matching technique.

Messages that are valid can be translated into requests for the game player. The result of the message translation can be two-fold. First, the message is parsed and then evaluated for correctness and validity. If the message does not meet this criterion, it may not be translated and forwarded to the game player for a response, such as on display 1026 in FIG. 1. Second, no command, request or message from the external communication interface ever reaches any further than the SAS engine. This process ensures that erroneous signals or data will not adversely affect the game.

The meters 1144 can include hard meters, which are mechanical devices and meters maintained in software by the GMC 1160. In one embodiment, electronic digital storage meters of at least 10 digits that accumulate and store all the meters required can be used. For example, the number of games played since a RAM clear can be accumulated. In a RAM clear, critical memory can be cleared of data. Further, the number of games since the last power-up can be accumulated. As another example, games since the last door close can be accumulated.

Some other functions which may be tracked by a physical or software meter include but are not limited to attendant paid jackpots, attendant paid cancelled credits, bill in, voucher in (e.g., credit voucher), voucher out, electronic fund transfer in, wagering account transfer in, wagering account transfer out, non-cashable electronic promotion in, cashable electronic promotion in, cashable promotion credits wagered, non-cashable electronic promotion out, cashable electronic promotion out, coupon promotion in, coupon promotion out, machine paid external bonus payout, attendant paid external bonus payout, attendant paid progressive payout, machine paid progressive payout, non-cashable promotion credits wagered, number of progressives won, number of jackpots won, number of games won, number of games lost and total amount paid by attendant. Other meters can include main door open, logic door open, cash door open and stacker door open.

In a particular embodiment, software meters can be accessed from an operator menu by turning a key on the side of the gaming machine. The operator menu can be output on one of the displays (e.g., 1018', 1012'). All software meters can be cleared upon a RAM clear. In addition to the meters, the machine can also display the configured denomination, theoretical payout and actual payout. This information is accessible from the operator menu under the statistics screen. This information can be cleared upon a RAM clear event.

The GMC 1160 is preferably mechanically secured within an interior of the gaming machine. For example the GMC 1160 can be contained in a metal box. The metal box can include a secure entry, such as a hinged door, that is lockable. The openings for cables and wiring in the metal box can be purposefully designed to be as small as possible while still allowing proper electrical wiring standards regarding bend radius and connector strain. The locking mechanism for the metal box can be monitored by one of the sensors 1140.

The GMC 1160 can include a motherboard. The motherboard can be the only circuit card that contains control programs. The control programs include those used to control programmable operations within the GMC 1160. Other gaming devices, such as the I/O devices 1134, can include device specific control programs. However, these device specific control programs don't affect or alter the behavior of the control programs on the motherboard. In one embodiment, the control programs are hash protected at install time per the above described techniques and then automatically repeatedly verified periodically or on other event driven bases.

The mother board can include a chipset 1110. The chipset 1110 can include a Northbridge 1106, which is a memory controller hub, and a Southbridge 1108, which is an I/O controller hub. The Northbridge 1106 and the Southbridge 1108 can communicate via an internal bus 1116.

The Northbridge 1106 can be coupled to a memory bus 1112 and a front side bus 1113. The front side bus 1113 can couple on or more processors, such as CPU 1102, to the Northbridge 1106. The CPU 1102 can receive clock signals from clock generator 1104 via the front side bus 1113.

The memory bus 1112 can couple one or more graphics cards, which include graphical processing units (GPUs), to the Northbridge 1106. The graphics card or cards can be installed in the graphics card slot(s). The graphics cards can be coupled to displays, such as display 1018'. Further, the memory bus 1112 can couple one or more memory slots 1115, configured to receive volatile random access memory, to the Northbridge 1102. The CPU 1102 can communicate with the volatile memory in the memory slots 1115 and the graphics card in the graphics card slot 1114 via the memory bus 1112 and the front side bus 1113.

The Southbridge 1108 can be coupled to one or more PCI slots 1118 via PCI bus 1120. In various embodiments, the Southbridge 1108 can provide a variety of communications interfaces. The communication interfaces include but are not limited to IDE, SATA, USB, Ethernet, an audio Codec and CMOS memory. In addition, the Southbridge can communicate with a flash ROM (BIOS) 1126 and super I/O 1128 via the LPC (Low Pin Count) bus 1152. Typically, super I/O 1128 supports older legacy devices, such as a serial port (UART), a parallel port, a floppy disk, keyboard and mouse. Some of the gaming devices, such as the sensors 1140, can be coupled to the Southbridge 1108 via super I/O 1128.

The GMC 1160 can be configured to execute gaming software 1130 to control playing of a respective one or more wager-based games. On boot-up, a self-bootstrapping check of basic hardware, firmware and software integrity 1132 can be performed using firmware logic driven by the BIOS 1126. In a particular embodiment, an isolated and separate hardware device can be installed which includes the boot-up checking algorithms for the basic hardware, firmware and software integrity. The separate hardware device can be coupled to the Southbridge 1108.

In one embodiment, the gaming software 1130 can be stored on two compact flash cards, which are not conventional ROM devices. The verification mechanism can use one or more SHA-1 hashes, which produce a message digest of some length, such as one hundred sixty bits. Message digests can be stored on both compact flash memories. A public/private key covered and/or symmetric key covered algorithm with a key of some length, such as a 512-bit key can be used to encrypt and decrypt the message digests. If any errors are detected in the validation of the gaming software 1130, the GMC 1160 can automatically switch to a tilt mode and halt execution of gaming actions. The GMC 1160 can be configured to prevent programs deemed to be invalid (e.g., those failing periodic verification checks) from running.

When the gaming software 1130 is compiled and built, one or more of its respective code and/or data segments can be hashed using a hash algorithm, such as the SHA-1 hash algorithm. Other hashing algorithms can be used and SHA-1 is mentioned for illustrative purposes only. The resulting hash answers can form the hash digest. This digest, along with the start and stop values for the validation algorithm, can be encrypted by a private key. The key can be stored in a computer which is not connected to any network and which is physically stored in a secure location, such as a locked safe. Alternatively or additionally the above described, secure encrypted SQL database may be used for assuring that decryption keys and/or procedures are not tampered with prior to validating the installed code and/or data segments.

In one embodiment, prior to use, the public key can be installed in a power-hit tolerant memory, such as the NVRAM 1122 on the motherboard. This step can be performed when the gaming machine is manufactured. In another embodiment, the corresponding public and/or symmetric keys can be loaded from a secure mobile memory device, such as an authentication compliant USB device, in the field. In one embodiment, the USB port is only accessible when the enclosure which holds the GMC 1160 is opened. Without a proper public key, the machine will not operate.

When the game initially powers up, the BIOS 1126 can run a Power On Self-Test (POST) and checksum over itself and/or perform other boot-strapping integrity self-checking. If these tests fail, the game does not boot and an operator can be required to clear this tilt. If the BIOS self-test passes, the BIOS can retrieve the public key from NVRAM 1122 and can run a CRC over the retrieved key to ensure it is the correct key. The correct CRC answer can be stored on the BIOS. If the public key does not exist or if the public key CRC returns an incorrect answer, the game can halt and prompt the user to install the correct public key.

Once the public key is validated, the BIOS 1126 can test the integrity of the code stored in the system compact flash 1130 by using the validated public key to decrypt the SHA signatures for the data stored on the system compact flash 1130 and the start and stop sector identifiers indicating where the respective segments of data are stored on the compact flash for each corresponding SHA signature. The data can be stored between the start and stop sectors, inclusive. Unused sectors can be set to 0 (zero). The BIOS 1126 runs a low-level block-by-block integrity check using one or more SHA-1 hashes over the kernel and operating system (Boot and Root) partitions and compares the result to the decrypted file from the manifest. In one embodiment, the operating system can be Linux and the kernel can be a Linux kernel. If any of the hash values does not match, the game automatically goes into tilt mode.

If the values match, the BIOS 1126 can load the now-validated boot loader program and can relinquish control of the validation process to the boot loader. The boot loader can be executed by the operating system using CPU 1102. The procedure can validate the entire partition, not just the file structure. Thus any unused or unallocated areas of the partition can be tested for unintended programs or data.

Next, a file-by-file SHA-1 verification (or other hash based verification) can be performed over the paytable, assets, and player files. The resulting information can be compared against the decrypted results from the manifest file and/or from the secure encrypted database server 2050'. If the calculated answers match the decrypted answers, the GMC will proceed with the boot-up. If the hash answers do not match, the game tilts and requires operator intervention to clear.

In one embodiment, as an additional security measure, a compressed file system that is designed to be read-only can be used. The file system may not support or contain a write command or the ability to write to a file. The file system can be compressed so that it is not human-readable.

Each block of data in the file system can have a corresponding CRC stored with the block. When the block is read, the CRC is calculated and compared with the stored CRC. If the answer does not match, the file system can generate an error and the game tilts. Any changes, whether additions, deletions, or modifications, will change the CRC of the affected blocks and cause the game to tilt. This feature, in effect, monitors the integrity of the entire file system as well as the integrity of the media on a real-time basis. Although CRC is mentioned here as one basis for data integrity validation, it is within the contemplation of the present disclosure to use of numerous other data and code integrity validation techniques including, but not limited to, the above described hash matching technique.

The SHA hash answers can be available on-screen and may also be accessed via the Gaming Authentication Terminal (GAT) interface. The GAT interface (not shown) can be provided as one of the I/O devices 1134 or within the super I/O 1128. The GAT interface can be configured to allow an operator to initiate an SHA-1 hash or an HMAC SHA-1 on-demand so that an operator (or other independent entity) can validate the integrity of the software 1130 at any time. In one embodiment, a nine-pin "D" connector is available to an operator or regulator (e.g., government authorized inspector) for access the GAT serial terminal.

Access to the GAT port requires opening of the main door. Further, it may require unlocking of the GMC enclosure. In one embodiment, a GAT port can be provided on the outside of the GMC enclosure. Hence, the GMC enclosure can remain locked while the GAT port is utilized.

As described above, the gaming machine can include a power hit tolerant memory (PHTM). For example, NVRAM 1122 (nonvolatile memory, for example a RAM coupled to battery 1124) can be used as a PHTM. The PHTM can be used to store crucial data, such as data generated during the play of a wager-based game. The PHTM can be configured to be able to quickly write the crucial data in response to a detection of an imminent power interruption. The CPU 1102 can be configured to detect a potential power interruption via the power interruption signal received from the power supply. The power interruption signal can indicate a fluctuation in the power.

Not all memory types may be suitable for use as a PHTM because their write times are not fast enough to store data between the detection of a potential power interruption and the power interruption. For example, some disk drives don't typically have fast enough write times for use as a PHTM. In one embodiment, a disk drive 1136 can be used. However, it requires that use of an uninterruptable power supply coupled to the disk drive 1136 and GMC 1160 to maintain power after the external AC power source is lost. Other types of memory with slower write times can be employed when an uninterruptable power supply is used.

Typically, a volatile RAM (random access memory) has a fast enough write speed to be used as a PHTM. However, after the power is lost, data stored in the volatile RAM is lost. To overcome this deficiency, a rechargeable battery, such as 1124, can be coupled to the RAM 1122 to provide persistence memory storage. This memory configuration can be referred to as a non-volatile RAM (NV-RAM). The battery power levels can be monitored so that it can be replaced as needed if it is no longer rechargeable. Alternatively or additionally, other forms of nonvolatile memory can be used including for example flash memory, phase change memory, etc.

In one embodiment, an NVRAM 1122 with a battery 1124 is shown inserted in one of the PCI slots 1118. The NVRAM 1122 can be used as a PHTM. In other embodiments, it may be possible to use a RAM inserted into one of the memory slots 1115 that is coupled to a battery. It yet another embodiment, it may be possible to use a high-speed USB connection to a memory storage device to provide a PHTM. As noted above, a hard disk, such as 1136, in combination with an uninterruptable power supply 1148 can be used as a PHTM.

In yet other embodiments, a GMC 1160 may utilize multiple memory storage devices to store crucial data. For example, the NVRAM 1122 can be used as a PHTM. However, crucial data can be copied to a non-PHTM from the NVRAM 1122 as needed. The copied data can provide a back-up of crucial data stored in the PHTM. Further, after crucial data is copied from the PHTM and the validity of the crucial data is verified, it may be deleted from the PHTM to free up space.

In one embodiment, crucial data can be stored in an NVRAM chip and in a high speed read/write compact flash. Crucial data such as RNG outcome, game recall, game state (credits, wager, winnings), and meters can be stored in NVRAM as files. Each file is hashed (MD5 or SHA-1 depending on the file) and the hash answer can be stored with the file and/or stored in encrypted form in the secure encrypted database server 2050'.

Additionally, in a particular embodiment, in NVRAM, the critical files can be kept in triplicate with each copy having a separate MD5 hash of the information. Prior to displaying each game outcome, this data can be rehashed and the three outcomes can be compared. If all three hash answers match, the data is deemed to be good and the game results are displayed to the player and a copy is stored in NVRAM. If two of the sets match, the non-matching set is deemed to be corrupt and it is replaced with a copy from one of the other two and the results are displayed to the player. If all three are different, memory can be deemed to be corrupt and a tilt can occur, halting play. The comparisons can occur continuously, each time the memory is updated, which may be multiple times during the course of a single play. However, a comparison can be performed at least once prior to displaying the game outcome.

To protect meters in the event of a power loss, various meters can be stored in NVRAM 1122. Thus, the meters are protected in the event of a power loss. The battery 1124 can be a lithium cell rated, based on the current draw of the NVRAM, to maintain the meters for at least 90 days. In one embodiment, the lithium cell can be rechargeable via the power supply 1146.

In particular embodiments, a game play history associated with recent games can be stored in the NVRAM 1122. This information can be retrieved from the NVRAM 1122 via an operator menu and output to a display, such as display 1018. In particular embodiments, a complete play history for the most recent game played and the nine prior games can be made available. A method involving game play history is described in more detail with respect to FIG. 9.

For a slot game, the game play history can include credits available, credits wagered, number of lines played (when appropriate), bonuses won, progressive won, game winnings (credits won) and credits cashed out. For "pick" bonuses, the intermediate steps involving the player picks can be retained. In games with free spins, the initiating game is retained with all or, for cases where more than fifty free games have been awarded, at least the last fifty free games played. This gaming information can be displayed in the recall screens through standard text meters, screen shots, graphical display elements and textual representations of specific situations that occurred during game play. The game play history can illustrate unique game play features associated with the game in general and specific game features that occurred during the instantiation of a particular play of the wager-based game.

A gaming machine controller configured to generate a wager-based game in accordance with player selected volatility parameters is described with respect to FIG. 5. Gaming software used to generate the wager-based game is discussed with respect to FIG. 5. With respect to FIG. 6, a power hit tolerant memory configured to store crucial data generated from playing the wager-based game is discussed. The crucial data can include information associated with selected volatility parameters and wager-based games generated using the selected volatility parameters.

With respect to FIG. 10, a method for responding to a power interruption on a gaming machine, which utilizes the power hit tolerant memory, is discussed. With respect to FIG. 8, a method of powering up a gaming machine is described. Finally, with respect to FIG. 9, a method playing back a game, such as a wager-based game including a first primary game and a second primary game, previously played on a gaming machine is discussed.

Figure 8:
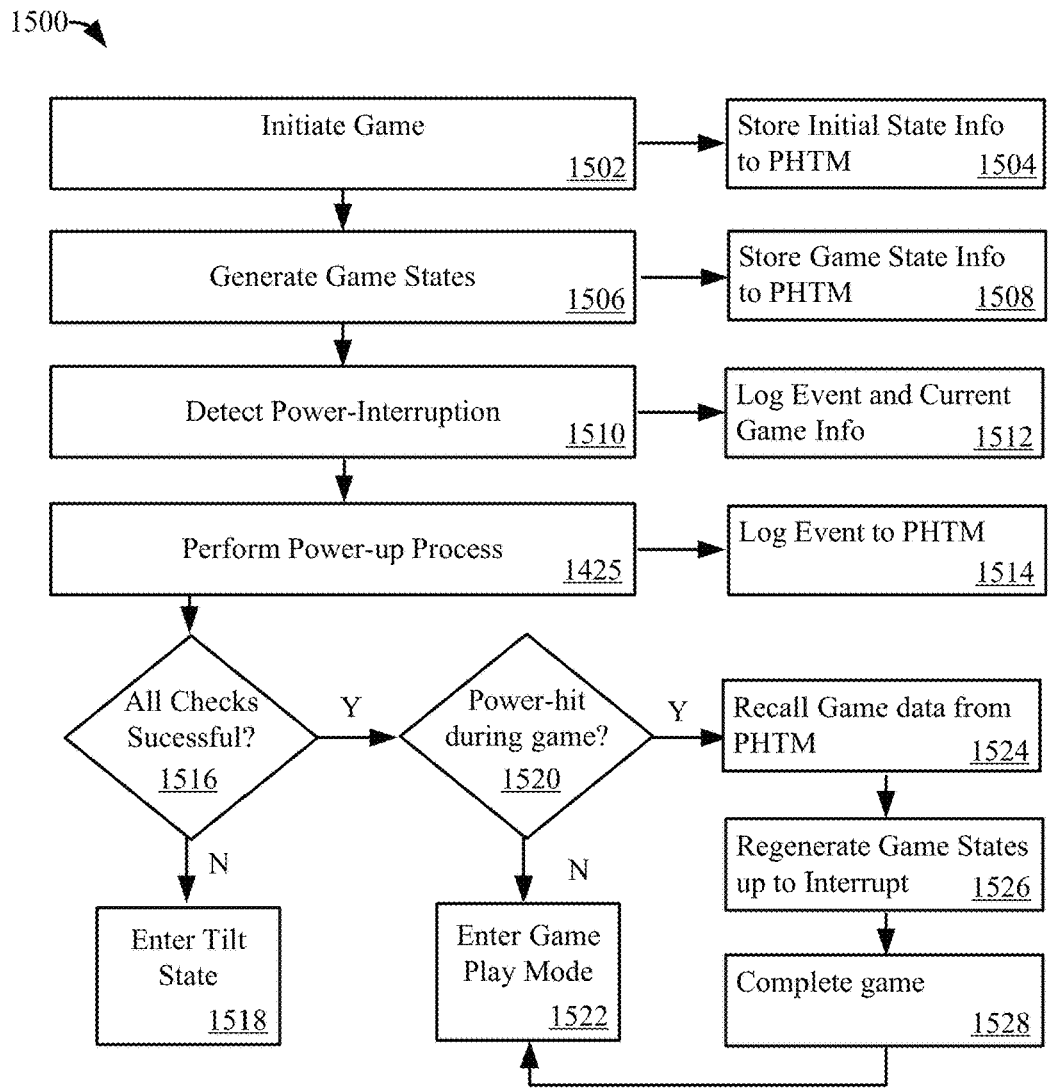
FIG. 8 illustrates a method powering up a gaming machine in accordance with the present disclosure.

FIG. 8 illustrates a block diagram of examples of gaming software 1130 that can be executed by a Gaming Machine Controller (GMC) 1160 in FIG. 4. The game software 1202 can be configured to control the play of the game. The play of the game includes determining a game outcome and award associated with the game outcome using the RNG software 1210.

The game software 1202 can be configured to utilize reel strips and/or wheels of chance with different properties. For example, virtual reel strips with different total number of symbols, different symbol combinations and different stopping probabilities. As described above, the game software may utilize different virtual reel strips in response to a selection of different prize structures involving scatter distributed symbols.

The award can be presented as a number of different presentation components where a portion of the award is associated with each presentation component. These presentation components can be referred to as game features. For example, for a video slot game, game features can involve generating a graphical representation of symbols moving, settling into final positions and lining up along a combination of different lines (e.g., paylines). Portion of the award can be associated with different lines. In another example, the game features can involve free spins and chance award of bonus wilds during the free spins. In yet another example, the game feature can involve generating a graphical representation of symbol and then actuating a mechanical device, such as wheel to indicate an award portion.

In a further example, a game feature can involve a bonus game where a portion of an award for a game is presented in a separate bonus game. The bonus game can involve inputting choices, such as a selection of a symbol. Similar to the primary game, the bonus game can include bonus game features where bonus game award is graphically presented in a number of different portions. A primary game can include game features which trigger different bonus games with different bonus game features.

As described above, game features and bonus game features can be stored to a power hit tolerant memory (PHTM). The PHTM software 1204 can be configured to manage the transfer of crucial data to and from the PHTM. Further, as described above, the PHTM software 1204 can be configured to verify the integrity of the data stored in PHTM.

In particular embodiments, the game 1202 has no knowledge of PHTM. Thus, the utilization of the PHTM can be totally abstracted from the game 1202 and contained in a shared object that is loaded at runtime. This shared object will also determine if the PHTM is available and how much memory space is available. If there is no PHTM, or it doesn't contain enough memory, the shared object can be configured to automatically use a disk file instead. This function may allow the game to be run in a windows environment and still have the ability to recover from a power hit.

One purpose of the PHTM 1204 is proper recovery from a power hit. In order to facilitate proper power hit recovery, numerous transition points can be built into the game 1202 where crucial data is stored to PHTM at each transition. The transitions can be implemented as states, which can be referred to as game states or game state machines. The states themselves can also be stored in PHTM so that on startup, after validating that the PHTM is not corrupt, the game 1202 can then check the current state that is stored. That state will then determine where the game will restart. The idea is that whenever a state transition occurs and is saved, the data needed to recover to that state has also been stored in PHTM.

Different approaches can be used in deciding when to save data to PHTM. In one embodiment, a thread runs in the background that constantly checks the data in memory against a copy of what's in PHTM as well as a force write flag. If the force write flag has been set or if it sees that the crucial data has changed, PHTM software 1204 writes it to the physical PHTM, updating the copy as well.

In another embodiment, the PHTM software 1204 can be configured to write all data directly to PHTM as it occurs. At certain times the PHTM software 1204 can be configured queue writes rather than committing them in order to make it an "all or nothing" write. This feature can be normally done for something that is going to cause a state change, a cash-out, etc. This feature can allow all the meters or crucial data associated with the game to be written at once, keeping the window of opportunity for corruption to the smallest amount of time possible.

In particular embodiments, multiple state machines can be used that are based on the overall game state machine. For example, separate "sub-state machines" can be used for critical functions that use external I/O devices, such as bill acceptors and printers. If the game 1202 restarts in a state that requires more granularity and has a different state machine such as a cash out or a ticket inserted state, it can switch to that sub-state machine to complete the actions and then return to the overall game state machine.

In particular embodiments, the sub-state machine concept can be used for areas of the game that are outside of the main game flow such as bonus games. For example, if the game is in a bonus game with bonus game feature including a free spin bonus round and the power cycles before all of the free spins have finished, the game will recover to the spin that was being executed when the power cycled and will continue from there. If the game is in a bonus game during a bonus game feature including a pick bonus, the game 1202 can recover to the point where the power cycle occurred. In particular, the picks that have already been made can be displayed and then the bonus game can continue from that point including receiving additional picks. Further, the game 1202 may be configured using the crucial data stored in the PHTM to regenerate on the display all or a portion of the game states prior to the power hit, such as the initial state of the game and game states that occurred prior to the bonus game.

The game playback 1206 can be used to display information associated with one or more game states of a wager-based game previously played on a gaming machine. As an example, a particular wager-based game can be initiated and played on the gaming machine. During game play of the particular game, crucial data associated with game states that occur can be stored to the PHTM. Subsequently, one or more additional games can be played on the gaming machine. Then, using crucial data recalled from the PHTM, game information associated with the particular game can be redisplayed on the gaming machine. The game information can include but is not limited to a) text information, b) screen shots that were generated during game play and c) a regeneration of all or a portion of a graphical game presentation associated with the particular game.

Typically, to access the gameplay back feature, the gaming machine has to be placed in a tilt mode where an operator menu is available. From the operator menu, using game playback software 1206, an operator can select a particular game for playback from among a plurality of games previously played on the gaming machine. To resume normal game play, the tilt mode can be cleared and the gaming machine can revert to a normal operating state. More details of game play back are described with respect to FIG. 9.

The security software 1208 can be configured to respond to information received from various security sensors disposed on the gaming machine and from the power-off security device (e.g., see 1138 in FIG. 4). For example, the security software 1208 can be configured to detect that a locking mechanism has been actuated on the gaming machine and then cause the gaming machine to enter a tilt mode. As another example, the security software 1208 can be configured to receive information from the power-off security device that the gaming machine door was opened while the gaming machine was being shipped. In response, the security software 1208 can cause the gaming machine to enter a tilt state. In yet another embodiment, the security software 1208 may not be able to detect a sensor, such as a sensor (e.g., see sensors 1140 in FIG. 4) which monitors a state of a door and in response enter a tilt state.

The RNG software 1210 can be configured to generate random numbers used to determine the outcome to a wager-based game. In one embodiment, a Mersenne twister random number generator (RNG) algorithm, which generates integers in the range [0, 2^k−1] for k-bit word length with a period of (2^19937)−1 can be used. It has a longer period and a higher order of equi-distribution than other pseudo-random number generators. The Mersenne Twister is also very fast computationally as it uses no division or multiplication operations in its generation process. It can work well with cache memory and pipeline processing.

In particular embodiments, the RNG cycles at seventy RNG cycles/second or above, such as equal to or above one hundred RNG cycles/second. This speed has been determined by engineers at the Nevada Gaming Control Board to be fast enough that it cannot be timed by the player. The tests showed that above seventy RNG cycles/second successfully hitting a specific outcome became sporadic, and the results were completely unpredictable at one hundred RNG cycles/second. An evaluation showed the variance in the contact mechanism of mechanical switches and the inherent variance in the "button press" detection circuitry, combined with the inability of a person to repeat a movement, provided enough ambiguity in the final registration of the button press to eliminate a player's ability to affect the payback characteristics of the game.

The RNG can be seeded using a plurality of variables. In particular embodiments, the RNG can be seeded by four variables that eliminate the same seed sequence from being used in more than one device, such as two gaming machines using the same RNG seed. The variables can be 1) absolute time, 2) time since the machine powered up, 3) machine number and 4) a random number from the kernel base RNG "/dev/urandom." The random number from the kernel can be associated with the Linux Kernel. This RNG "/dev/urandom" can be based on random occurrences, such as times between keystrokes, mouse movements, timing between interrupts, and hardware occurrences. These occurrences can be used to build and maintain an entropy pool.

The system protects against the same sequence in several ways. First, even if two games are powered on at exactly the same time, there is enough variability in the exact time that the time since power up should prevent any two games from having the same number returned from this function. Also, the "urandom" RNG is entropy based, and is self-seeded from environmental noise contained in the kernel, which makes it unlikely that two machines would ever have the same seed. Finally, the machine number (EPS number) is used as part of the seed. Because this number is used to uniquely identify the gaming machine on the floor, it should always be different from any other machine.

The communications software 1212 can be used to provide communications via the various communication interfaces and using various communication protocols. For example, the communications software 1212 can support the SAS protocol over wired or wireless communication interfaces. In another example, the communication software may allow the gaming machine to communicate with a mobile device via a wireless communication interface using a Bluetooth™ protocol.

The player tracking software 1214 may allow the GMC to communicate with a player tracking device installed on the gaming machine and/or directly with a remote server which provides player tracking services. For example, a player tracking device can be configured to communicate a GMC to transfer credits to and from the gaming machine. In another embodiment, the GMC can be configured to receive player tracking information from a card inserted in a card reader (e.g., see 1028 in FIG. 1) or via wireless communications with a player's mobile device. Then, GMC can communicate with a remote server to receive information associated with a player and send information associated with the player's game play on the gaming machine.

The devices software 1216 may be used to allow the GMC to communicate with various devices coupled to the gaming machine, such as I/O devices coupled to gaming machine. For example, the devices software may allow the GMC to communicate with a bill acceptor (e.g., see bill acceptor 1024 in FIG. 1) and in response add credits to the gaming machine. In another example, devices software may allow the GMC to communicate with a printer (e.g., see printer 1022 in FIG. 1) and in response cash out credits from the gaming machine in the form of printed ticket.

The power hit software 1218 can allow GMC to respond to power hits. For example, the power hit software can monitor the power supply and in response to a detection of power fluctuations update the PHTM with crucial data. In another example, when the gaming machine is power-up from a power hit, the power hit software 1218 can determine the power hit occurred during game play and initiate a restoration of the gaming machine to its state when the power hit occurred.

The tilt software 1220 can be configured to monitor sensors and gaming devices for tilt conditions. In response to the detection of a tilt condition, the tilt software 1220 can cause the gaming machine to enter a tilt state. Further, the tilt software 1220 can record tilt information to the PHTM.

For example, when a machine door open is detected, the game can tilt with a hard tilt that prevents play and disables the game. If the gaming machine includes a tower light, the tower light can flash to indicate that a door is open. Further, a "DOOR OPEN" indication can be displayed on the main display screen. Upon a detection of the door closing, the tower light can stop flashing and the "DOOR OPEN TILT" can be replaced with a "DOOR CLOSED SOFT TILT."

The door open tilt condition can be the behavior for all the machine doors, such as door 1014 in FIG. 1 or a CPU enclosure door (not shown). Additionally, the behavior may not change for multiple doors that are open. Thus, the "DOOR OPEN" indication can remain on, and the machine will be disabled until all the doors are closed. After the final door is closed, the tower light can go off, the game can become playable and the "DOOR OPEN" indication can be written over by a "DOOR CLOSED" indication which will remain until the end of the next game cycle.

A number of tilts can be generated that must be cleared by an attendant. These tilts may include clearing the condition with a key switch or, for tilts such as "PAPER OUT," the tilt may clear automatically after the attendant has remedied the malfunction. A low battery for a PHTM (e.g., see NVRAM 1122 in FIG. 4 or 1204 in FIG. 5) can be indicated by a "RAM BATTERY" tilt.

A "PRINT FAILURE" tilt can occur when there is a failure to print a ticket. In response, a printer hard tilt error can be issued and the description will indicate that the printer is offline. The tilt can be cleared when the printer is brought back online.

A "PRINT MECHANISM/PAPER JAM" tilt can occur for a paper jam. The game can indicate the paper jam has occurred and the printer is off-line (e.g., see printer 1022 in FIG. 1). This tilt can be cleared by clearing the jam and reinserting the paper into the printer.

A "PAPER OUT" tilt can occur when the printer runs out of tickets (e.g., see printer 1022 in FIG. 1). In response to detecting no remaining tickets, the game can display information indicating no paper is available and the game can be disabled. This tilt can be cleared when new printer stock is fed into the printer.

A defective storage media tilt can occur when an error is detected in a critical memory device, such as the memory storing the game software (e.g., see 1130 in FIG. 4), the memory storing the BIOS (e.g., see BIOS 1126 in FIG. 4) or the PHTM storing crucial data (e.g., see NVRAM 1122 in FIG. 4). A message indicating the validation error can be displayed. This tilt may require a "RAM CLEAR" to remedy the tilt condition. A "RAM CLEAR" can erase all meter, recall and other critical memory.

As described above, multiple copies of crucial data can be stored in the PHTM (e.g., see NVRAM 1122 in FIG. 4) and the GMC (e.g., see GMC 1160 in FIG. 4) can be configured to detect and correct copies of faulty data. When uncorrectable memory is detected in the PHTM or another device, it can result in a "CRITICAL MEMORY ERROR" tilt. Again, this tilt can require a "RAM CLEAR" to remedy the condition. Again, the "RAM CLEAR" can erase all meter, recall and other critical memory.

A "BILL JAM" can occur when the bill acceptor detects a bill jam (e.g., see bill acceptor 1024 in FIG. 1). The tilt condition can be displayed on the display, such as main display 1018 in FIG. 1. This is a hard tilt which disables the game until an operator clears the bill jam condition.

When a stacker is full, the game can displays a soft tilt error on the main screen. A "stacker full" may be displayed as a security measure. The stacker can be coupled to a bill acceptor and located in the main cabinet of a gaming machine (e.g., see bill acceptor 1024 in FIG. 1). The game can remain playable but will not accept any further currency or tickets. This tilt is automatically cleared once the stacker is emptied or replaced. When the stacker is removed, the game will be disabled and display a "STACKER OPEN" message. This tilt can be cleared when the stacker is reinserted.

The software validation software 1222 can be executed by the CPU to validate the various software components on the gaming machine. For example, hashes of memory blocks can be performed and compared to stored hash values (e.g., stored in encrypted form in the secure encrypted database server 2050'). This software can differ from the validation logic which is executed separately by the BIOS to perform validation functions.

The metering software 1224 can be used to update the hard meters and generate and update the soft meters. The metering software 1224 can be configured to store metering information to the PH™ (e.g., see NVRAM 1122 in FIG. 4). Examples of the meters which can be maintained are described above with respect to meters 1144 in FIG. 4.

Figure 6:
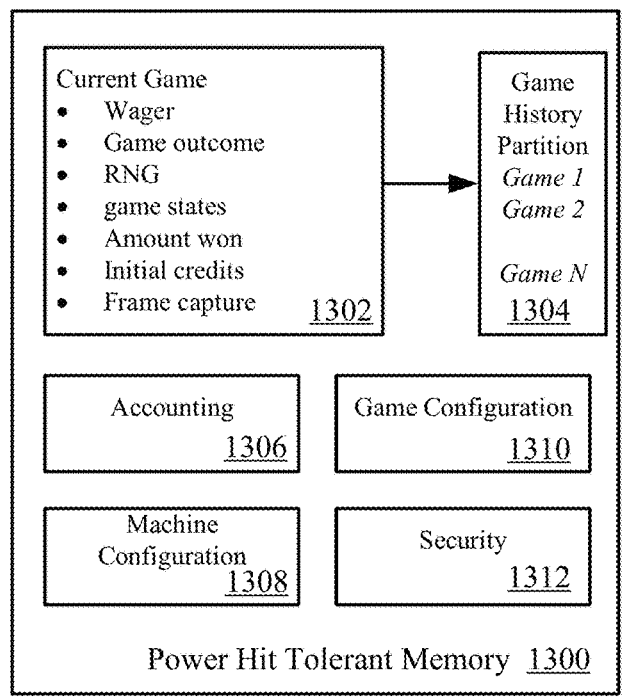
FIG. 6 illustrates a block diagram of power hit tolerant memory in accordance with the present disclosure.

FIG. 6 illustrates a block diagram of one embodiment of a power hit tolerant memory (PHTM) (Additional details of PHTMs are described with respect to NVRAM 1122 in FIG. 5 and PHTM 1204 in FIG. 5). Crucial information associated with the current game can be stored in 1302. Some examples of crucial information include but are not limited to a wager amount, a game outcome, one or more random numbers to determine the game outcome, information about game states and sub-states including the current game state, an amount won, initial credits and frame captures associated with one or more states. As described above, this information can be used to return the game to a current state after a power-hit. The one or more random numbers can be used to regenerate a particular game outcome associated with the random numbers and the wager amount.

After a game is completed, it can be moved to a game history partition 1304. The game history partition can store crucial data associated with a plurality of previously played games. For example, in one embodiment, the PHTM 1300 can be configured to store crucial data associated with the current game and nine past games. In another embodiment, the PHTM 1300 can store information associated with up to one hundred past games.

When the maximum number of games in the game history partition is reached, the software which manages the PHTM 1300 can be configured to delete the oldest game. This process can occur prior to starting the next game. For example, if a maximum of ten games are stored in the game history 1304, then prior to the play of the eleventh game, the oldest game can be cleared from the memory. In one embodiment, prior to the deletion of the crucial data associated with the oldest game, it can be copied to a secondary persistent memory.

In 1306, accounting information can be stored. The accounting information can include the metering information previously described above. In some embodiments, this information can be recalled in the event of a power failure.

In 1308, machine configuration information can be stored. Some example of machine configuration information can include but is not limited to Manufacturer ID, date of manufacturing, machine ID, operating system version, number of screens, cabinet type, hard disk capacity, PH™ capacity, number of PHTM banks, printer model information, touch screen model information, card reader model information, bill acceptor model information, display model information, jurisdiction information, casino name and other information, sales order #, manufacture information, logo's, etc. In one embodiment, the public key used in the code validation process can be stored here.

In game configuration 1310, game configuration information can be stored. The game configuration information can include paytable selection, game features selections, bonus selections, jackpot contribution setting, denominations, max number of paylines, number of game titles and game versions. A gaming machine can have many paytables with different holding percentages which can be selected by the casino. Similarly, selectable game features and bonus features can be provided.

In security 1312, security information can be stored. Security information can include information that lead to a tilt condition and the associated tilt condition. For example, if a door is opened, the security information can include when the door was opened, when game play was disabled, when the door was closed, when the tilt condition was cleared and when game play was subsequently enabled.

Figure 7:
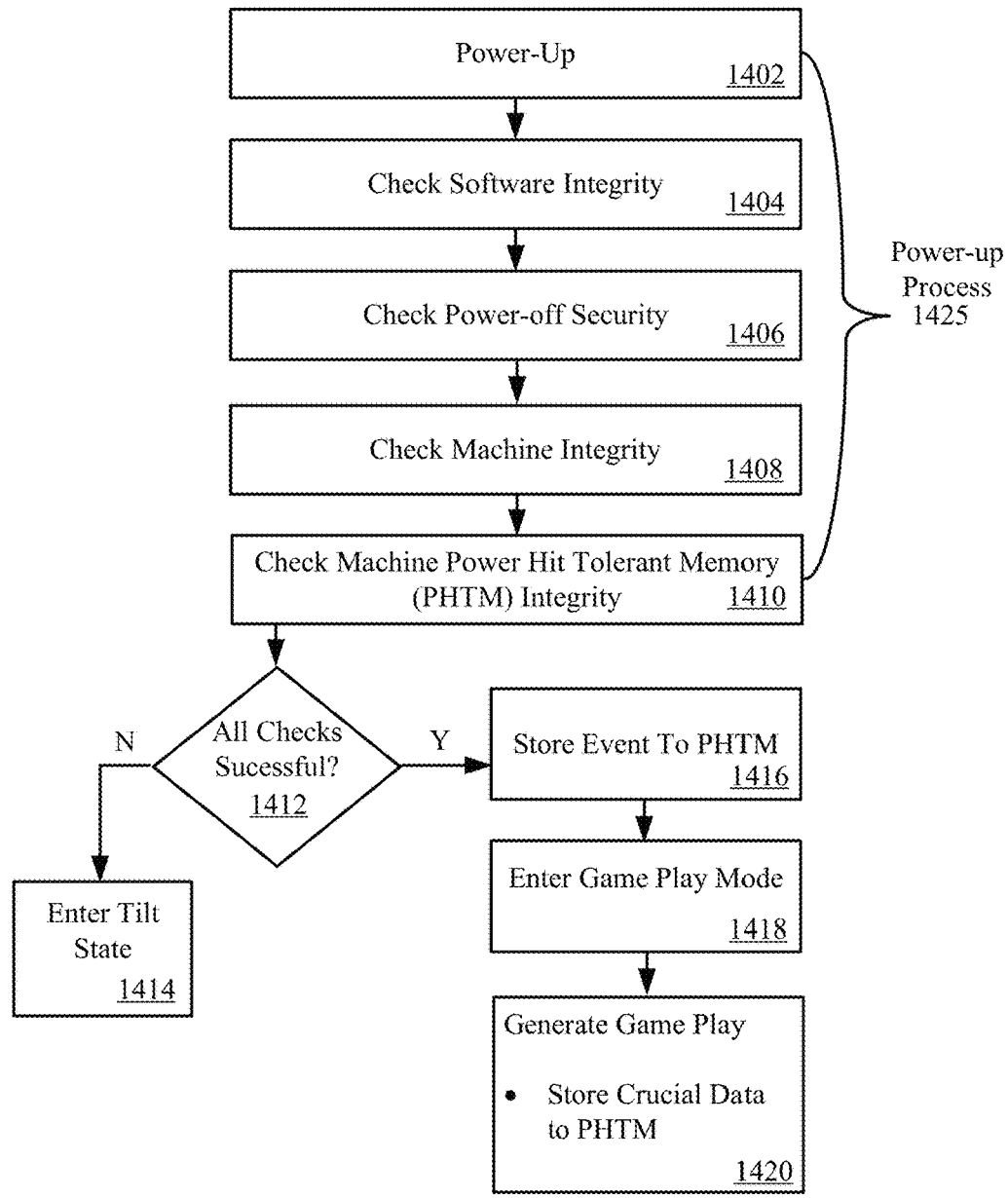
FIG. 7 illustrates a method for responding to a power interruption on a gaming machine in accordance with the present disclosure.

FIG. 7 illustrates a machine-implemented automated method 1400 for responding to a power interruption on a gaming machine. In 1402, the gaming machine can begin a power-up process 1425. The power-up process can begin when a power switch in the interior of the gaming machine is turned on or when power is restored after a power interruption. In response to detecting external power is available, a signal can be generated which initiates a software integrity check on in 1404.

In 1404, the software integrity on the gaming machine can be checked. In particular embodiments, a public key/private key method and a "ladder of trust" can be used to verify control programs executed by the game controller. The initial rung of the ladder of trust can be the BIOS EPROM (see 1126 in FIG. 4), which may be a conventional ROM device. This conventional ROM device can load and can verify the initial code which continues the "verify then load"

ladder of trust until the entire operating system and the game is loaded. This process was described above in detail with respect to FIG. 4.

In 1406, the power-off security device (see 1138 in FIG. 4 can be checked. The power-off security can monitor all the doors in the EGM. For example, the doors can use optical emitter/sensor pairs, but some might also use Hall-effect sensors. The system can be a standalone device with a CPU, RAM, NVRAM, sensors I/O board, and battery. The battery can be configured to last at least 30 days. It can be configured to record all critical events, such as power brown out, power black-out, main door open, logic (CPU) door open, bill acceptor door open, printer door open, top box door open and player tracking door open. These critical events may have occurred while the GMC was shut down and hence not monitoring the gaming machine for critical events.

In 1408, the machine integrity can be checked. For example, the security sensors on the gaming machine can be checked to verify all the doors are closed. Further, gaming devices, such as the printer and the bill acceptor, can be checked to determine the devices are operating properly (e.g., see printer 1022 and bill acceptor 1024 in FIG. 1).

In 1410, critical memory on the gaming machine can be checked. For example, the PHTM can be checked to make sure the stored information matches associated hash values. As described, a hash value can be generated for crucial data stored in the PHTM. The hash values can be stored with the crucial data. When the PHTM integrity is checked, new hash values can be generated and compared to the stored hash values.

In 1412, the GMC can determine whether all the checks were successful. If one or more of the checks are not successful, in 1414, the gaming machine can enter a tilt state and game play on the gaming machine can be disabled. Information about the tilt state can be output to a display, such as the main display on which a gaming presentation for a wager-based game is output.

In 1416, when all the checks are successful, event information associated with the successful power-up process can be stored to the PHTM. For example, the time that the gaming machine was enabled for game play can be stored to the PHTM. In one embodiment, as described above, this information can be used to generate a seed for a random number generator used on the gaming machine.

In 1418, the gaming machine can enter game play mode. Thus, the gaming machine is enabled to accept bills and tickets that are redeemed for credits on the gaming machine. After credits are deposited, the gaming machine can be used to make wagers on the game(s) available for play on the gaming machine. In 1420, the GMC can generate wager-based game play on the gaming machine and store crucial game play data to the PHTM.

FIG. 8 illustrates a method 1500 powering up a gaming machine. In 1502, a wager can be placed and a game can be initiated. In 1504, initial state information associated with the game can be stored to the PHTM. In 1506, game states associated with the game can be generated. In 1508, crucial data associated with the game states can be stored to the PHTM.

In 1510, a power-interruption can be detected. For example, the GMC can receive a signal from the power supply which indicates a power spike associated with a power shutdown has occurred. In 1512, the event can be logged to the PHTM. In addition, current game state information can be logged to the PHTM prior to the power failure. After power is lost, the GMC may no longer operate unless an uninterruptable power supply is available.

In 1425, the power-up process in FIG. 8 can be performed. In 1514, this event can be logged to the PHTM. In 1516, whether the power-up process is successful can be checked. In 1518, if the check is not successful, the gaming machine can be placed in a tilt state and information about the tilt state can be output.

In 1520, a check can be performed to determine whether the power-hit occurred during the play of a game and prior to completion of the game. This information can be stored in the PHTM. In 1524, when the power-hit occurred during the play of a game, data associated with the game including the current game state can be retrieved from the PHTM. In 1526, the game can be regenerated up to the current game state just prior to the power hit. In some embodiments, the gaming machine can be configured in the current game state without showing any information leading up to the current game state. In other embodiments, one or more game states prior to the current game state can be regenerated and output to the display.

In 1528, the current game can be completed. In 1522, the game can be enabled for game play. In 1520, when the power-hit didn't occur during play of a game, the gaming machine can be powered-up and enabled for game play in 1522.

Figure 9:
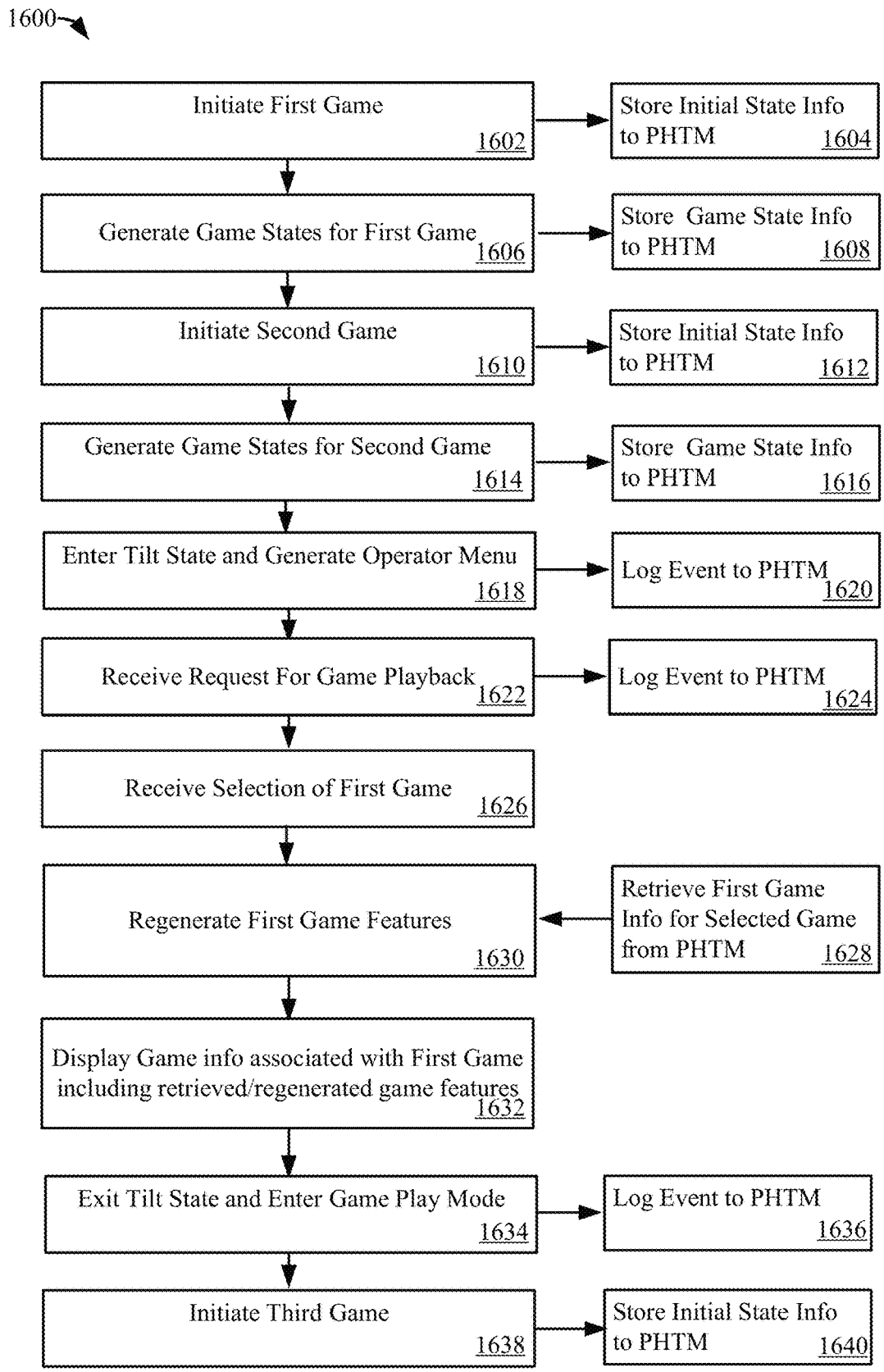
FIG. 9 illustrates a method playing back a game previously played on a gaming machine in accordance with the present disclosure.

FIG. 9 illustrates a method 1600 playing back a game previously played on a gaming machine. In 1602, a first game can be initiated on the gaming machine. In 1604, initial state information about the first game can be stored to the PHTM. In 1606, game states for the first game can be generated. In 1608, the game states can be stored to the PHTM. As described, in the event of a power-hit during play of the first game, the GMC (e.g., see GMC 1160 in FIG. 4) can be configured to restore the game and the gaming machine to a game state just prior to the power hit using information retrieved from the PHTM (e.g., see NVRAM 1122 in FIG. 4).

After the completion of the first game, in 1610, a second game can be initiated. The initial state information for the second game can be stored to the PHTM (e.g., see NVRAM 1122 in FIG. 4). In 1614, the game states for the second game can be generated and the second can be brought to completion. In 1616, the game state information for the second game can be stored to the PHTM.

In 1618, the gaming machine can enter a tilt state. In one embodiment, the tilt state can be initiated in response to the operator inserting and turning a key in a locking mechanism on the outside of the gaming machine cabinet. Then, an operator menu can be generated and output to a display on the gaming machine. In 1620, the tilt state event can be logged in the PHTM.

In the 1622, the gaming machine using an input device, such as a touch screen, can receive a request for a game playback. The game playback can involve displaying information about a game previously played on the gaming machine. In 1624, this event can be logged to the PHTM. In 1626, a particular previously played game can be selected from among a plurality of games with game information stored in the PHTM. In this example, the first game played is selected.

In 1628, game information associated with the first game is retrieved from the PHTM. Some examples of game information which can be retrieved includes but are not limited one or more of random numbers used to generate the first game, screen shots, award information, bet information, credit information and screen shots from one or more game states.

In 1630, first game features can be regenerated. These game features can include animations of the play of the game, which represent one or more game states, or static images representing different game states. The animations of the play of the game can be regenerated using random numbers associated with the original play of the first game.

In 1632, game information associated with the first game, including the retrieved screen shots, regenerated static images and regenerated animations, can be output to a display on the gaming machine. In one embodiment, the display can be the display where the game presentation for the wager-based game is output (e.g., see display 1018 in FIG. 1). In 1634, the gaming machine can exit the tilt state and enter game play mode. For example, to initiate this process an operator can turn a key in the locking mechanism and remove it from the locking mechanism.

In 1636, initiation of game play can be logged as an event to the PHTM. In 1638, a third game on the gaming machine can be initiated. In 1640, the initial state information associated with the third game can be stored to the PHTM.

Because such information and program instructions may be employed to implement the systems/methods described herein, the present disclosure of invention relates to tangible (non-transitory) machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure. As used herein, the term "and/or" implies all possible combinations. In other words, A and/or B covers, A alone, B alone, and A and B together.

With respect to any material incorporated herein into by reference, it is to be understood that if there is conflict between the incorporated material and the present disclosure, the present disclosure controls. If there is conflict between two or more of the incorporated materials, the later dated one controls.

While the present disclosure of invention has been particularly shown and described with reference to specific embodiments thereof, it will be understood by those skilled in the art that changes in the form and details of the disclosed embodiments may be made without departing from the spirit or scope of the present teachings. It is therefore intended that the disclosure be interpreted to include all variations and equivalents that fall within the true spirit and scope of the present teachings.

What is claimed is:

1. A gaming machine system comprising:
a cabinet including an entry that provides access to an interior of the cabinet, a locking mechanism coupled to the entry and a plurality of security sensors wherein at least one of the plurality of security sensors is used to detect access to the interior of the cabinet;
a power supply, disposed within the interior of the cabinet, receiving power from an external power source;
a power-off security device disposed within the interior of the cabinet, coupled to one or more of the plurality security sensors and monitoring access to the cabinet when the power supply is unpowered;
a display, coupled to the cabinet, outputting content associated with play of one or more wager-based games;
an input source receiving one or more selections from a player;
a non-volatile memory, disposed within a locked box within the interior of the cabinet, storing non-transitory gaming software used to generate the one or more wager-based games on the gaming machine wherein the gaming software defines a plurality of selectable prize structures and a plurality of sets of virtual reel strips wherein predetermined permutations of chance spins of the sets of the virtual reel strips are respectively associated with one of the plurality of selectable prize structures and wherein properties of each of the predetermined permutations of chance spins of the sets of the virtual reel strips are selected such that a probability of winning respective progressive prizes remains approximately constant for each of the sets;
a power-hit tolerant memory, disposed within the locked box within the interior of the cabinet and storing crucial data associated with a play of a plurality instances of the wager-based game;
a gaming machine controller, including a processor and a memory, disposed within a locked box within the interior of the cabinet, coupled to the power supply, the power-off security device, the plurality of security sensors, the display, the non-volatile memory and the power-hit tolerant memory, the gaming machine controller 1) controlling the play of the plurality of instances of the wager-based game, 2) automatically repeatedly validating the gaming software, 3) automatically repeatedly verifying integrity of crucial data stored within the power hit tolerant memory, 4) monitoring the power-off security device and the plurality of security sensors to detect tilt conditions; 5) outputting to the display a plurality of prize structures, 6) during play of a particular instance of wager-based game, receiving a first indication of a selection from the input source of a first prize structure from among the plurality of selectable prize structures, 7) generating an outcome to the particular instance of the wager-based game; 8) storing crucial data associated with the play of the plurality of instances of the wager-based game to the power-hit tolerant memory;
wherein at least one of said validating of the gaming software and said verifying of integrity of crucial data by the gaming machine controller includes use of an encrypted SQL database server that stores encrypted verification records in a first portion thereof and stores corresponding decryption keys and/or identifications of decryption procedures in an essentially read-only portion thereof.

2. The machine system of claim 1 wherein the encrypted SQL database server is configured to return to respective requesting devices, decrypted versions of respectively identified ones of its stored encrypted verification records by using corresponding ones of the decryption keys stored in the essentially read-only portion and/or by using corresponding ones of the decryption procedures identified by the identifications of decryption procedures stored in the essentially read-only portion.

3. The machine system of claim 2 wherein the encrypted SQL database server is configured to return to the respective requesting devices, the respective decrypted versions of the identified ones of its stored encrypted verification records only after the respective requesting devices provide or cause to be provided to the encrypted SQL database server, respective authenticating tokens and/or other authenticating credentials demonstrating respective authorization for the respective requesting devices to receive the respective decrypted versions of the identified ones of the stored encrypted verification records.

4. The machine system of claim 2 wherein the decryption keys stored in the essentially read-only portion and the decryption procedures identified by the identifications of decryption procedures stored in the essentially read-only portion include at least one of a symmetric decryption key and a symmetric decryption procedure.

5. A machine-assisted method of installing at least one of executable code and control data into a gaming machine system, the method comprising:
   first supplying identified segments of at least one of the executable code and the control data to a pre-installation build assembler;
   second supplying installer-executable and corresponding scripts to the build assembler, the supplied scripts including instructions for automatically causing a pre-specified secured database to receive from a pre-specified installer respective verification records for respectively identified ones of the first supplied segments, to encrypt the received verification records, to store the encrypted verification records in association with their respective segment identifications and to store in an essentially read-only portion of the database and in association with respective ones of the segment identifications, corresponding decryption keys and/or identifications of decryption procedures that can be used to decrypt the encrypted verification records;
   third supplying to the pre-specified installer a build generated by the build assembler, the supplied build including the corresponding scripts and the respectively identified segments of at least one of the executable code and the control data; and
   actuating the pre-specified installer to automatically install into the gaming machine system the supplied and respectively identified segments of at least one of the executable code and the control data, to automatically generate the respective verification records for the installed segments and to automatically execute the scripts supplied by said third supplying so as to thereby cause the installer to send to the database, the generated verification records and their respective segment identifications and to thereby cause the database to automatically receive and encrypt the received verification records, to store the encrypted verification records in association with their respective segment identifications and to store in the essentially read-only portion of the database and in association with respective ones of the segment identifications, the corresponding decryption keys and/or identifications of decryption procedures that can be used to decrypt the encrypted verification records.

6. The method of claim 5 wherein one or more of the respective verification records include hashes of their respective segments of code and/or data.

7. The method of claim 6 wherein one or more of the hashes are SHA-1 hashes.

8. The method of claim 5 wherein the decryption keys stored in the essentially read-only portion and the decryption procedures identified by the identifications of decryption procedures stored in the essentially read-only portion include at least one of a symmetric decryption key and a symmetric decryption procedure.

9. The method of claim 5 wherein the database is maintained in an encrypted SQL database server and the script instructions include SQL commands.

10. The method of claim 9 wherein the encrypted SQL database server is configured to return to respective requesting devices, the respective decrypted versions of the identified ones of its stored encrypted verification records only after the respective requesting devices provide or cause to be provided to the encrypted SQL database server, respective authenticating tokens and/or other authenticating credentials demonstrating respective authorization for the respective requesting devices to receive the respective decrypted versions of the identified ones of the stored encrypted verification records.

11. The method of claim 5 wherein the first supplying of identified segments of at least one of the executable code and the control data comprises supplying respective certificates that identify and authenticate the respective segments.

12. The method of claim 5 wherein the first, second and third supplying steps are carried out within a secured code production facility.

13. The method of claim 12 and further comprising:
   compiling the identified segments of executable code in the secured code production facility.

14. The method of claim 13 and further comprising:
   generating within the secured code production facility one or more of to-be-installed segments of control data where the generated segments of control data include at least one of:
   a Jenkins build number;
   subversion revision numbers;
   identification of to be monitored directories and/or files within and/or external of the gaming machine system;
   identifications of to be monitored TCP ports; and
   identifications of to be monitored UDP ports.

15. The method of claim 5 and further comprising:
   after actuating the pre-specified installer, waiting for the installer to finish one or more of its script driven installation tasks and determining whether the one or more script driven installation tasks completed within a respective one or more of pre-specified allotted times for the respective one or more script driven installation tasks, and in response to determining that one or more of pre-specified allotted times has been exceeded, generating a corresponding alarm.

16. A non-transitory computer-readable storage storing instructions for one or more digital data processors, the stored instructions including:
   first instructions causing at least one of the processors to supply installer-executable and corresponding scripts to a build assembler, the supplied scripts including script instructions for automatically causing a pre-specified secured database to receive from a pre-specified installer respective verification records for respectively identified ones of the pre-supplied segments of code and/or data, to encrypt the received verification records, to store the encrypted verification records in association with respective segment identifications of the pre-supplied segments and to store in an essentially read-only portion of the database and in association with respective ones of the segment identifications, corresponding decryption keys and/or identifications of decryption procedures that can be used to decrypt the encrypted verification records;

second instructions causing at least one of the processors to supply to the pre-specified installer a build generated by the build assembler, the supplied build including the corresponding scripts and the respectively identified segments of code and/or data; and third instructions causing at least one of the processors to actuate the pre-specified installer to automatically install into a gaming machine system the pre-supplied and respectively identified segments of code and/or data, to automatically generate the respective verification records for the installed segments and to automatically execute the scripts provided in accordance with said first instructions so as to thereby cause the installer to send to the database, the generated verification records and their respective segment identifications and to thereby cause the database to automatically receive and encrypt the received verification records, to store the encrypted verification records in association with their respective segment identifications and to store in the essentially read-only portion of the database and in association with respective ones of the segment identifications, the corresponding decryption keys and/or identifications of decryption procedures that can be used to decrypt the encrypted verification records.

17. The non-transitory computer-readable storage of claim 16 wherein the database is maintained in an encrypted SQL database server and the script instructions include SQL commands.

* * * * *

UNITED STATES PATENT AND TRADEMARK OFFICE
CERTIFICATE OF CORRECTION

PATENT NO. : 10,713,888 B2
APPLICATION NO. : 15/909698
DATED : July 14, 2020
INVENTOR(S) : Ruiz et al.

Page 1 of 1

It is certified that error appears in the above-identified patent and that said Letters Patent is hereby corrected as shown below:

In the Claims

Column 44, Line 28 (Claim 1), please change "plurality instances" to --plurality of instances--.

Signed and Sealed this
Twenty-second Day of September, 2020

Andrei Iancu
*Director of the United States Patent and Trademark Office*